US012016517B2

(12) United States Patent
Nieschwitz et al.

(10) Patent No.: US 12,016,517 B2
(45) Date of Patent: Jun. 25, 2024

(54) ADAPTER FOR A VACUUM HOSE

(71) Applicant: H-P Products, Inc., Louisville, OH (US)

(72) Inventors: Darrell V. Nieschwitz, Louisville, OH (US); Greg A. Calderone, Canton, OH (US); Shawn C. Metz, Louisville, OH (US)

(73) Assignee: H-P PRODUCTS, INC.

(*) Notice: Subject to any disclaimer, the term of this patent is extended or adjusted under 35 U.S.C. 154(b) by 162 days.

(21) Appl. No.: 17/160,912

(22) Filed: Jan. 28, 2021

(65) Prior Publication Data

US 2021/0235952 A1 Aug. 5, 2021

Related U.S. Application Data

(60) Provisional application No. 63/008,005, filed on Apr. 10, 2020, provisional application No. 62/970,006, filed on Feb. 4, 2020.

(51) Int. Cl.

| | |
|---|---|
| ***A47L 9/24*** | (2006.01) |
| ***A47L 5/38*** | (2006.01) |
| ***H01R 35/04*** | (2006.01) |

(52) U.S. Cl.

CPC ................ *A47L 9/246* (2013.01); *A47L 5/38* (2013.01); *A47L 9/248* (2013.01); *H01R 35/04* (2013.01)

(58) Field of Classification Search

CPC . A47L 9/249; A47L 5/38; A47L 9/248; H01R 35/04

USPC .............................................................. 285/7

See application file for complete search history.

(56) References Cited

U.S. PATENT DOCUMENTS

| | | | | |
|---|---|---|---|---|
| 2,953,806 | A | 7/1958 | Walker | |
| 3,520,725 | A | 7/1970 | Hamrick | |
| 4,336,427 | A | 6/1982 | Lindsay | |
| 6,459,056 | B1 | 10/2002 | Graham | |
| 7,010,829 | B2 | 3/2006 | Harman et al. | |
| 7,624,472 | B2 | 12/2009 | Ambrose | |
| 8,001,650 | B2 | 8/2011 | Trotter | |
| 8,400,258 | B2 | 3/2013 | Aikens et al. | |
| 8,590,098 | B2 | 11/2013 | Smith et al. | |
| 9,717,381 | B2 | 8/2017 | Harman | |
| 2006/0174441 | A1 * | 8/2006 | Genoa | A47L 9/327 15/410 |
| 2008/0066252 | A1 | 3/2008 | Herron, Jr. | |
| 2008/0301903 | A1 | 12/2008 | Cunningham et al. | |

(Continued)

OTHER PUBLICATIONS

US 10,405,716 B2, 09/2019, Coltrin (withdrawn)*
Merriam Webster, Definition of Circular, 2012 (Year: 2012).*
Merriam Webster, Definition of Oblong, 2011 (Year: 2011).*

*Primary Examiner* — David S Posigian
*Assistant Examiner* — Tyler James McFarland
(74) *Attorney, Agent, or Firm* — Sand, Sebolt & Wernow Co., LPA

(57) ABSTRACT

A hose cuff on a vacuum hose for connection with at least one inlet valve of a central vacuum system includes a first end, a second end opposite the first end, a longitudinal axis between the first end and the second end, a first section adjacent to the first end, and a second section adjacent to the second end. The first section is adapted to connect to a first inlet valve and the second section is adapted to connect to a different second inlet valve. The first section includes a metal portion adapted to contact pins of the first inlet valve.

22 Claims, 16 Drawing Sheets

(56) References Cited

U.S. PATENT DOCUMENTS

| | | | | |
|---|---|---|---|---|
| 2013/0106199 | A1 | 5/2013 | Forrest | |
| 2015/0135471 | A1 | 5/2015 | Cunningham | |
| 2017/0319043 | A1* | 11/2017 | Kerntopf | A46L 9/0693 |
| 2017/0347849 | A1* | 12/2017 | Majer | A47L 9/248 |
| 2019/0148984 | A1 | 5/2019 | Bevelacqua et al. | |
| 2019/0274504 | A1* | 9/2019 | Christensen | A47L 9/246 |

* cited by examiner

ADAPTER FOR A VACUUM HOSE

CROSS REFERENCE TO RELATED APPLICATIONS

This disclosure claims the benefit of and priority to U.S. Provisional Application Ser. No. 62/970,006, filed on Feb. 4, 2020 and U.S. Provisional Application Ser. No. 63/008,005, filed on Apr. 10, 2020.

TECHNICAL FIELD

The present disclosure relates to a hose cuff of a central vacuum system. Specifically, the present disclosure relates to a hose cuff that includes a first section that interacts with a first inlet valve and a second section that interacts with a different second inlet valve.

BACKGROUND

Central vacuum systems may be used in a home, a recreational vehicle, or in a commercial setting. These systems comprise of a main vacuum source usually located in a basement or an adjacent location. The vacuum source is connected to various inlet valves located throughout at building via conduits or tubing. The inlet valves, or valve boxes as they are referred to in the industry, are mounted in a wall, inside a cabinet, or in other structures, by various flanges or brackets. Some examples are shown in U.S. Pat. Nos. 2,953,806, 3,520,725, 4,336,427, 6,459,056, and 7,624,472.

Many vacuum systems use a hose that is slidably moveable and contained within the vacuum conduit and expandable therefrom so that the hose is pulled from the conduit for cleaning an area and then retracted back into the vacuum conduit for storage. Some examples of such systems are shown in U.S. Pat. Nos. 2,953,806, 7,010,829, and 8,001,650. These systems have a debris pickup nozzle which is attached to the end of the hose and is retained in or stored closely to the inlet valve when not in use. These systems also describe a locking mechanism to secure the hose in an extended position as shown by a manually actuated locking mechanism of U.S. Pat. No. 7,010,829 or an external locking loop as shown in U.S. Pat. No. 8,590,098. Other systems include a hose that is stored outside of the conduit in a storage unit near an inlet valve assembly. With these systems, the hose may be removed from the storage unit and pushed into an inlet.

Generally, the locking mechanism located on an inlet valve interacts with a hose cuff located on a hose thereby locking the hose in an extended position to prevent the hose from being removed from an inlet valve. Unfortunately, not all locking mechanisms are compatible with all hose cuffs, let alone hose cuffs of a retractable hose, and not all inlet valves have a locking mechanism. As a result, using a hose with a locking mechanism that is not compatible with an inlet valve may cause a user to inadvertently remove the hose form the inlet valve or may cause a loss of suction. Thus, it is desirable to provide a hose cuff that may interact with different inlet valves.

SUMMARY

Currently, one type of hose cuff may interact with only one type of inlet valve. If a hose cuff is connected to an incompatible inlet valve, the hose cuff may not be retained within the inlet valve or the vacuum may lose suction. Thus, there is a continuous need for a hose cuff that properly interacts with different inlet valves. To address this continuing need, the present disclosure provides a hose cuff that is capable of interacting with different inlet valves. The hose cuff includes a first section and a second section. The first section is adapted to connect to a first inlet valve and the second section is adapted to connect to a different second inlet valve. These sections form a hose cuff that may be securely connected to different inlet valves without a loss of suction. As such, aspects of the present disclosure relate to an improved hose cuff that properly interacts with different inlet valves.

In an exemplary aspect, an embodiment of the present disclosure provides a hose cuff on a retractable hose for connection with a central vacuum system inlet valve includes a first end, a second end opposite the first end, a first section adjacent to the first end, and a second section adjacent to the second end. The first end may be adapted to connect to a first inlet valve and the second end may be adapted to connect to a different second inlet valve. The hose cuff is useful when connected with a retractable hose that is stored within a wall or behind a wall. This enables the hose to universally connect with a plurality of different types of secondary inlet valves located in different rooms of the structure than the primary inlet valve.

In one aspect, an exemplary embodiment of the present disclosure may provide a hose cuff for connection with at least one inlet valve of a central vacuum system inlet valve. The hose cuff may include a first end, a second end, a longitudinal axis, a first section, and a second section. The second end may be opposite the first end. The longitudinal axis may be between the first end and the second end. The first section may include a metal portion and a nonmetal portion. The first section may be adjacent to the first end and may be adapted to connect to a first inlet valve. The metal portion and the nonmetal portion may be adapted to contact pins of the first inlet valve. The second section may be adjacent to the second end and may be adapted to connect to a different second inlet valve. This exemplary embodiment or another exemplary embodiment may provide wherein the metal portion extends 360° around the first section. This exemplary embodiment or another exemplary embodiment may provide wherein the metal portion extends less than 360° around the first section. This exemplary embodiment or another exemplary embodiment may provide wherein the metal portion includes at least one notch and wherein nonmetal portion is adjacent to the at least one notch. This exemplary embodiment or another exemplary embodiment may provide wherein the metal portion includes at least one circular aperture and wherein the least one circular aperture is adjacent to the nonmetal portion.

This exemplary embodiment or another exemplary embodiment may provide wherein the metal portion includes at least one oblong aperture and wherein the oblong aperture is adjacent to the nonmetal portion. This exemplary embodiment or another exemplary embodiment may provide wherein the second section is adapted to receive the first section. This exemplary embodiment or another exemplary embodiment may provide wherein the first section comprises a first end adjacent to the first end of the hose cuff and a second end opposite the first end of the first section and wherein the metal portion is adapted to receive the second end of the first section. This exemplary embodiment or another exemplary embodiment may provide a first seal adapted to receive the second end of the first section. This exemplary embodiment or another exemplary embodiment may provide wherein the first seal is a first elastomeric O-ring. This exemplary embodiment or another exemplary embodiment may provide wherein the first section comprises a radial outermost point relative to the longitudinal axis, wherein the metal portion comprises an outer wall that faces away from the longitudinal axis, and wherein the outermost point and the outer wall have a same distance from the longitudinal axis. This exemplary embodiment or another exemplary embodiment may provide wherein the first elastomeric O-ring is radially further from the longitudinal axis than the outermost point of the first section.

This exemplary embodiment or another exemplary embodiment may provide wherein the first elastomeric O-ring is adapted to form a hermetic seal between the hose cuff and the first inlet valve. This exemplary embodiment or another exemplary embodiment may provide wherein the first elastomeric O-ring has a first surface facing the first end of the hose cuff and a second surface facing the second end of the hose cuff and wherein the first surface of the first elastomeric O-ring contacts the metal portion and the first section and the second surface contacts the second section. This exemplary embodiment or another exemplary embodiment may provide wherein second section comprises an annular pitched wall that pitches radially outward from the first end of the second section towards the second end of the second section and is adapted to contact the first inlet valve. This exemplary embodiment or another exemplary embodiment may provide wherein the second section comprises: a first end; a second end opposite the first end and adjacent to the second end of the hose cuff; and a first wall defining at least a portion of a channel. This exemplary embodiment or another exemplary embodiment may provide a first cam positioned within the channel and adapted to depress a moveable member of the different second inlet valve. This exemplary embodiment or another exemplary embodiment may provide wherein first cam is adapted to depress the moveable member as the first cam rotates about the longitudinal axis.

This exemplary embodiment or another exemplary embodiment may provide a second seal around the second section of the hose cuff. This exemplary embodiment or another exemplary embodiment may provide wherein the second seal is a second elastomeric O-ring adapted to form a hermetic seal between the different second inlet valve and the hose cuff. This exemplary embodiment or another exemplary embodiment may provide wherein the first section comprises an annular curved wall comprising a first end adjacent to the first end of the hose cuff and a second end opposite the first end of the annular curved wall; a first ledge that extends radially inward relative to the longitudinal axis from the second end of the curved wall to a first wall, wherein the first wall comprises a first end adjacent to the first ledge and a second end opposite the first end of the first wall; a second ledge that extends radially inward relative to the longitudinal axis from the second end of the first wall to a second wall a metal portion adapted to frictionally fit around the first wall; a first seal adapted to receive the second wall, wherein the second section is adapted to receive the second wall of the first section and wherein when the metal portion is fitted around the first wall and when the second section receives the second wall, the first seal is between the metal portion, the second ledge, and the first end of the second section. This exemplary embodiment or another exemplary embodiment may provide wherein the second elastomeric O-ring is the radial furthest point of the hose cuff. This exemplary embodiment or another exemplary embodiment may provide wherein the hose cuff is connected to a hose of a central vacuum cleaning system and wherein the hose cuff and hose are adapted to be stored within a conduit of the central vacuum cleaning system.

In another aspect, an exemplary embodiment of the present disclosure may provide a method for activating a central vacuum cleaning system. The method may include inserting a hose cuff connected to a hose assembly of the central vacuum cleaning system into an inlet valve. The cuff may include a metal portion and a nonmetal portion. The method may further include contacting the metal portion with a first pin of the inlet valve. The method may further include activating the central vacuum system by engaging a switch on a handle connected to the hose assembly. This exemplary embodiment or another exemplary embodiment may provide contacting the metal portion with the first pin and a second pin of the inlet valve assembly; and rotating the hose cuff to contact the nonmetal portion with the first pin. This exemplary embodiment or another exemplary embodiment may provide wherein contacting the metal portion with the first pin and the second pin of the inlet valve assembly turns on the central vacuum cleaning system. This exemplary embodiment or another exemplary embodiment may provide wherein contacting the nonmetal portion with the first pin turns off the central vacuum system.

In yet another aspect, another exemplary embodiment of the present disclosure may provide a hose cuff on a vacuum hose for connection with at least one inlet valve in a central vacuum system and the at least one inlet valve comprising at least two metal pins, the hose cuff comprising: a first end; a second end opposite the first end; a longitudinal axis between the first end and the second end; and a conductive material at least partially circumscribing the longitudinal axis configured to contact the at least two metal pins on the at least one inlet valve and adapted to complete an electrical circuit to turn on the central vacuum system. This exemplary embodiment or another exemplary embodiment may provide wherein the conductive material is a metal ring. This exemplary embodiment or another exemplary embodiment may provide wherein the contact between the metal ring and the at least two pins completes an electrical circuit. This exemplary embodiment or another exemplary embodiment may provide a first section adjacent to the first end and adapted to connect to a first inlet valve; and a second section adjacent to the second end and adapted to connect to a different second inlet valve; wherein the first section comprises a first end adjacent to the first end of the hose cuff and a second end opposite the first end of the first section and wherein the metal ring is adapted to receive the second end of the first section. This exemplary embodiment or another exemplary embodiment may provide wherein the first section comprises a radial outermost point relative to the longitudinal axis, wherein the conductive material comprises an outer wall that faces away from the longitudinal axis, and wherein the outermost point and the outer wall have a same distance from the longitudinal axis. This exemplary embodiment or another exemplary embodiment may provide a first elastomeric O-ring that is radially further from the longitudinal axis than the outermost point of the first section. This exemplary embodiment or another exemplary embodiment may provide wherein the first elastomeric O-ring is adapted to form a hermetic seal between the vacuum hose cuff and the first inlet valve. This exemplary embodiment or another exemplary embodiment may provide wherein the first elastomeric O-ring has a surface first portion facing the first end of the hose cuff and a surface second portion facing the second end of the hose cuff and wherein the surface first portion of the first elastomeric O-ring contacts the conductive material and the first section, and the surface second portion contacts the second section. This exemplary embodiment or another exemplary embodiment may provide wherein second section comprises an annular pitched wall that angles radially outward from the first end of the second section towards the second end of the second section and is adapted to contact the first inlet valve. This exemplary embodiment or another exemplary embodiment may provide wherein the conductive material extends 360° around the longitudinal axis. This exemplary embodiment or another exemplary embodiment may provide wherein the conductive material extends less than 360° around the longitudinal axis. This exemplary embodiment or another exemplary embodiment may provide wherein the conductive material defines at least one notch, and wherein nonconductive material is adjacent to the at least one notch. This exemplary embodiment or another exemplary embodiment may provide wherein the conductive material defines at least one circular aperture and wherein nonconductive material is adjacent or within the least one circular aperture. This exemplary embodiment or another exemplary embodiment may provide wherein the conductive material defines at least one oblong aperture and wherein the oblong aperture is adjacent to a nonconductive portion. This exemplary embodiment or another exemplary embodiment may provide a first wall; an annular curved wall comprising a first end adjacent to the first end of the hose cuff and a second end opposite the first end of the annular curved wall; a first ledge that extends radially inward relative to the longitudinal axis from the second end of the curved wall to the first wall, wherein the first wall comprises a first end adjacent to the first ledge and a second end opposite the first end of the first wall; wherein the conductive material is radially exterior the first wall and disposed close to the second end of the hose cuff than the annular curved wall.

In yet another aspect, another exemplary embodiment of the present disclosure may provide an adapter for a vacuum hose cuff comprising: a first end; a second end opposite the first end; a conductive material; and a cylindrical wall that extends from the first end to the second end and comprises a first wall portion that is at least partially surrounded by the conductive material and a second wall portion that is sized to be received within a bore of a vacuum hose cuff, wherein the first wall portion and the conductive material are adapted to couple with an inlet valve comprising metal pins that protrude from a wall of the inlet valve. This exemplary embodiment or another exemplary embodiment may provide an annular curved wall comprising a first end adjacent to the first end of the adapter and a second end opposite the first end of the annular curved wall; a first ledge that extends radially inward relative to a longitudinal axis from the second end of the annular curved wall to the cylindrical wall, wherein the cylindrical wall comprises a first end adjacent to the first ledge and a second end opposite the first end of the cylindrical wall; wherein the conductive material is radially exterior the cylindrical wall and disposed close to the second end of the adapter than the annular curved wall. This exemplary embodiment or another exemplary embodiment may provide wherein the conductive material is a metal ring that entirely circumscribes the longitudinal axis, and contact between the metal ring and the metal pins completes an electrical circuit to turn on a central vacuum system.

Additionally, another aspect of another exemplary embodiment may provide a method comprising: inserting a hose cuff connected to a hose assembly of a central vacuum system into an inlet valve, wherein the hose cuff includes a conductive material; contacting the conductive material with a first pin of the inlet valve; contacting the conductive material with a second pin on of the inlet valve; completing an electrical circuit pathway for electricity to flow from the first pin to the second pin through the conductive material; activating the central vacuum system by way of the electricity flowing through the first and second pins.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (i.e., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
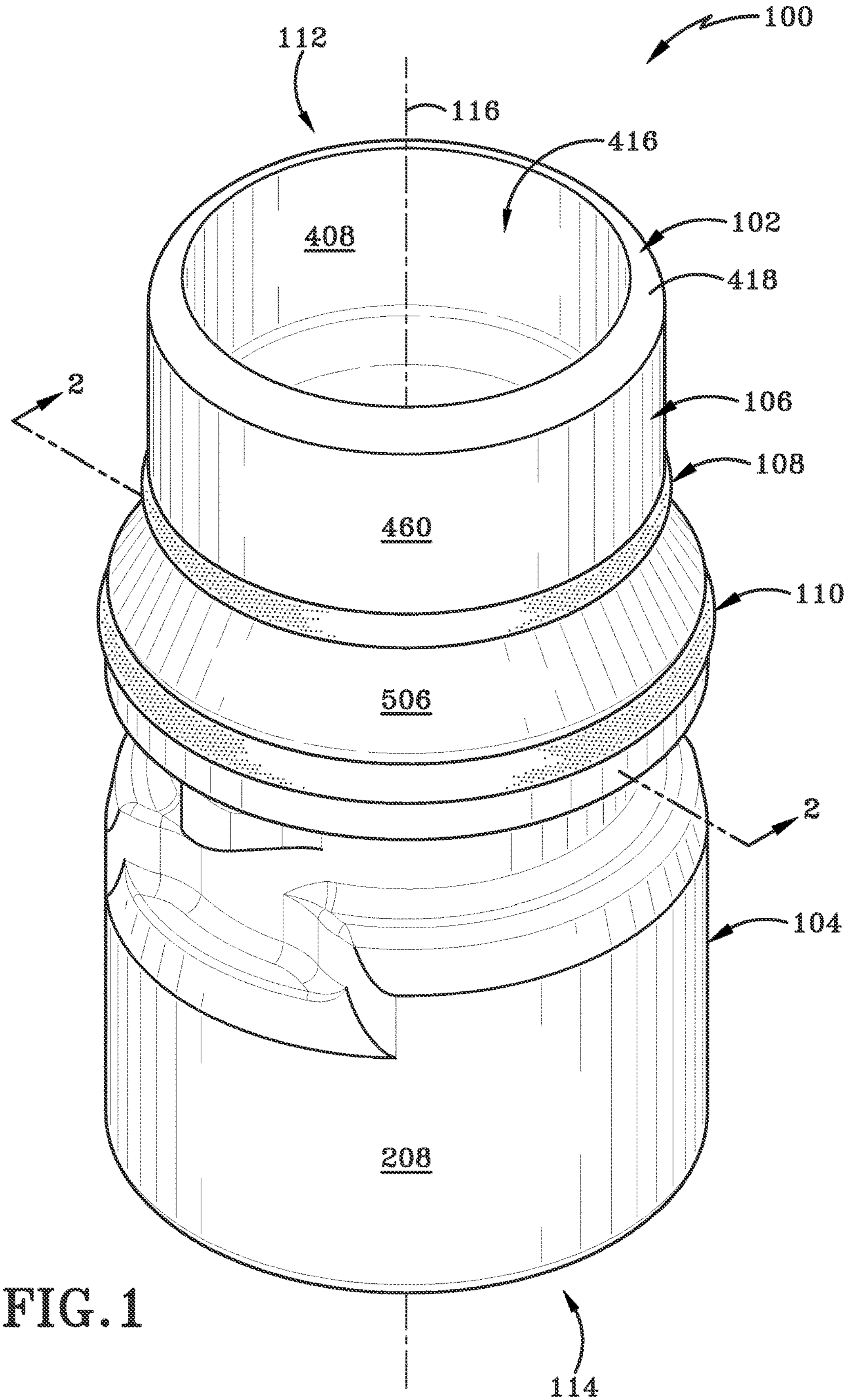
FIG. 1 is a perspective view of a hose cuff in accordance with an exemplary embodiment of a metal ring of the present disclosure.

FIGS. 1-5 illustrate a hose cuff 100 of a hose assembly that interfaces with an inlet valve assembly of a central vacuum cleaning system. When the hose cuff 100 of the hose assembly interfaces with the inlet valve assembly, the hose cuff 100 and the inlet valve assembly form a seal which allows the central vacuum cleaning system to operate. In one particular embodiment, the hose cuff 100 interfaces with both a primary inlet valve and a multiplicity of secondary inlet valves. Typically, when a central vacuum cleaning system has both primary and secondary inlet valves, the primary valve is a valve that stores a retractable hose to which the hose cuff 100 is connected. As such, the vacuum hose carrying hose cuff 100 may be stored behind or within a wall of the structure. This enables the hose to be extracted or retracted relative to the primary inlet valve. When the hose is in a retracted and stored position, either within or behind a wall, a nozzle end of the hose may be extracted from the primary valve. Then, the hose may be disconnected from the primary valve. Once the hose is disconnected, a user may carry the hose to another location within the structure to connect the hose cuff 100 with a secondary inlet valve having a differing connection structure than the primary inlet valve. Thus, the hose cuff 100 effectuates a universality for the hose by allowing the hose to connect with different types of secondary valves. For example, the hose cuff 100 enables a retractable hose to interface with a primary inlet valve that is manufactured by a first manufacturer utilizing a first connection-type or configuration and to interface with a secondary inlet valve that is manufactured by a different manufacturer utilizing a different second connection-type or configuration.

The hose cuff 100 comprises a first section 102, a second section 104, a metal ring 106, a first seal 108, a second seal 110, a first end 112, a second end 114 opposite the first end 112, and a longitudinal axis 116 between the first end 112 and the second end 114. Some portions of the hose cuff 100 will be described relative to the longitudinal axis 116 and may be used in conjunction with the terms circumferential, or radial, relative to the longitudinal axis 116.

Figure 2:
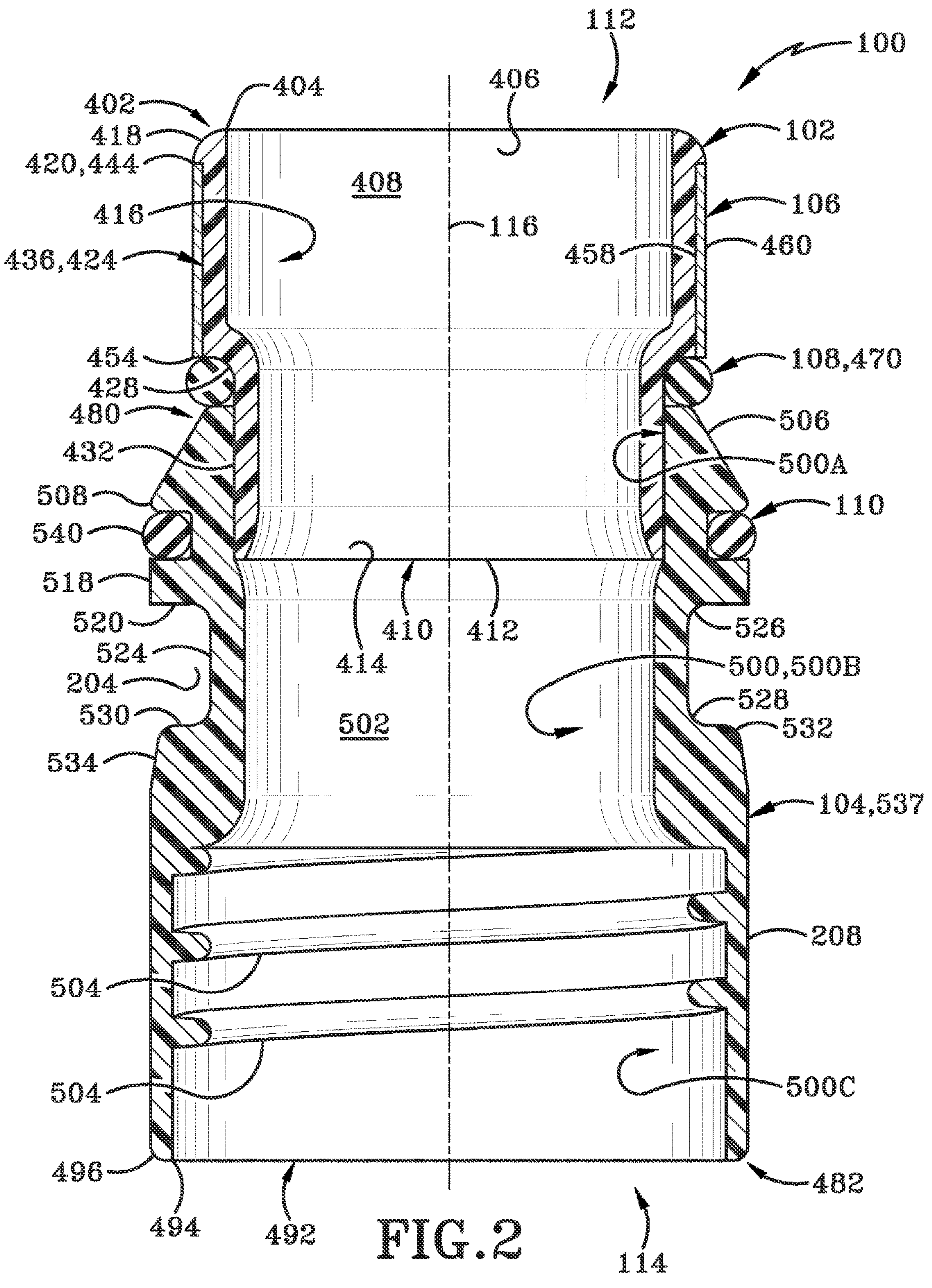
FIG. 2 is a longitudinal cross section of the hose cuff depicted in FIG. 1 taken along line 2-2 in FIG. 1.
Figure 3:
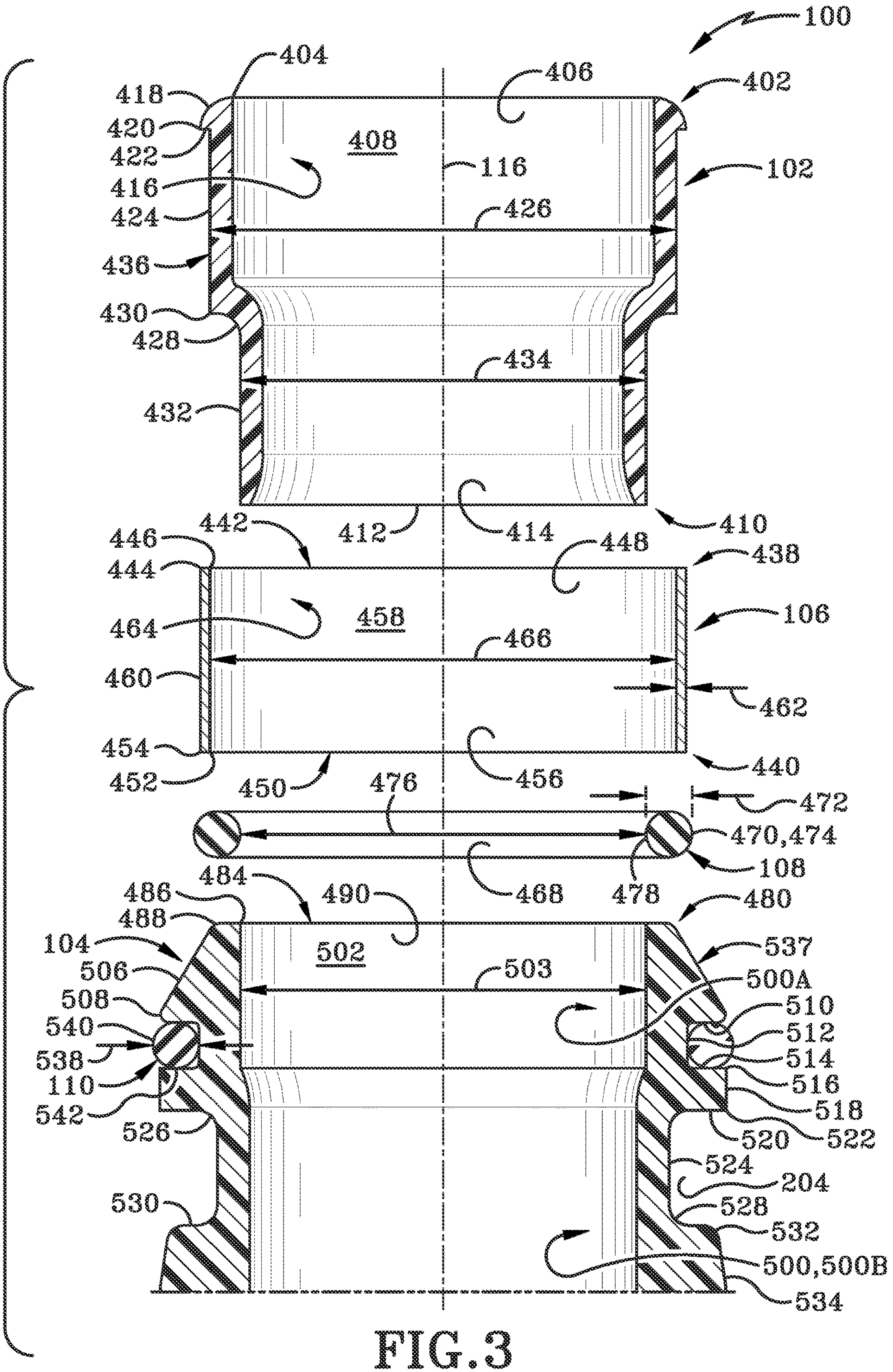
FIG. 3 is an exploded longitudinal cross section of the hose cuff of FIG. 1.

As depicted in FIG. 2 and FIG. 3, the first section 102 comprises a first end 402, which also defines the first end 112 of the hose cuff 100. First end 402 extends circumferentially around the longitudinal axis 116 and defines an inner annular edge 404 defining a first opening 406 of the first section 102. An inner surface 408 extends longitudinally from inner edge 404 to an opposing second end 410 of the first section 102. The first section 102 also comprises an annular chamfered edge 412 adjacent to the second end 410 which defines a second opening 414 of the first section 102. Chamfered edge 412 circumscribes longitudinal axis 116 such that a first bore 416 defined by the inner surface 408 extends between the first opening 406 and the second opening 414.

The first section 102 further comprises an annular exterior curved wall 418 which curves downwardly from the first end 402 and curves radially outward from the longitudinal axis 116. The annular curved wall 418 is convexly curved between the first end 402 and a terminal end 420 of the curved wall 418, which is the radial outermost point of first section 102. A first ledge 422 that is generally perpendicular to the longitudinal axis 116 extends radially inward from the terminal end 420 to a first wall 424 that extends circumferentially around, and generally parallel to, the longitudinal axis 116. The first wall 424 includes an exterior diameter 426 measured through the longitudinal axis 116 from one first wall 424 to another opposing first wall 424. A second ledge 428 extends radially inward from a terminal end 430 of the first wall 424. The second ledge 428 extends radially inward from the terminal end 430 to a second wall 432. The second ledge 428 is generally perpendicular to the longitudinal axis 116. The second wall 432 is parallel to the longitudinal axis 116 and extends longitudinally to the second end 410 of the first section 102. The second wall 432 extends circumferentially around and generally parallel to the longitudinal axis 116. The second wall 432 includes an exterior diameter 434. The exterior diameter 434 is measured through the longitudinal axis 116 from one of the second wall 432 to another opposing second wall.

The first ledge 422 is positioned closer to the first end 402 than the second ledge 428. Stated otherwise, the second ledge 428 is positioned closer to the second end 410 than the first ledge 422. The first ledge 422 has a length that is larger than the second ledge 428. The first ledge 422 and the second ledge 428 are both annular ledges that extend circumferentially around the longitudinal axis 116. The first ledge 422 and the second ledge 428 are concentric about the longitudinal axis 116. In this embodiment, the longitudinally aligned length of the second wall 432 is approximately equal to the that of first wall 424, however other dimensional configurations are possible. Collectively curved wall 418, first ledge 422, first wall 424, second ledge 428, and second wall 432, define an outer surface 436 of first section 102. The outer surface 436 of the faces radially outward from the longitudinal axis 116. In one particular embodiment, the first section 102 is formed from a uniform, monolithic member formed from a suitably rigid material so as to withstand deformation when the vacuum system of the present disclosure is in operation. First section 102 may be fabricated from a polymer material; however other rigid materials are entirely contemplated, such as metal. Furthermore, the integral structure of the first section 102 may be fabricated from multiple elements having similar configurations as one having skill in the art would understand.

Metal ring 106 comprises a first end 438 opposite a second end 440 aligned along the longitudinal axis 116. The first end 438 is defined by an annular first surface 442 bound by a first outer edge 444 and first inner edge 446 defining a first opening 448. The second end 440 is defined by an annular second surface 450 bound by a second inner edge 452 and a second outer edge 454 defining a second opening 456. A cylindrical inner wall 458 faces toward the longitudinal axis 116 and extends downwardly parallel to the longitudinal axis 116 from the first inner edge 446 to the second inner edge 452. A cylindrical outer wall 460 faces away from the longitudinal axis 116 and extends parallel to the longitudinal axis 116 from the first outer edge 444 to the second outer edge 454. The length of the inner wall 458 and outer wall 460 is substantially equal to the length of first wall 424 such that when the annular first surface 442 of the metal ring 106 contacts the first ledge 422 of the first section 102, second annular surface 450 does not extend beyond the terminal end 430 of the first wall 424. The metal ring 106 may be fabricated from any electrically conductive metal (i.e., silver, copper, gold, aluminum, etc.).

The metal ring 106 further comprises a cross sectional width 462 defined as the length between the first inner edge 446 and the first outer edge 444 or as the length between the second inner edge 452 and the second outer edge 454. In this embodiment, the cross sectional width 462 has substantially the same length as the first ledge 422. However, other cross sectional widths 462 are envisioned. Since the cross sectional width 462 has substantially the same length as the first ledge 422, when the annular first surface 442 of the metal ring 106 contacts the first ledge 422 of the first section 102, the outer wall 450 does not extend beyond the terminal end 420 of the curved wall 418.

Furthermore, the annular first surface 442 and the annular second surface 450 circumscribe the longitudinal axis 116 such that a bore 464 defined by the cylindrical inner wall 458 extends between the first opening 448 and the second opening 456. The bore 464 has an inner diameter 466 measured through longitudinal axis 116 between opposing cylindrical inner walls 458. The inner diameter 466 of the bore 464 is slightly greater than the outer diameter 426 of the first walls 424 of the first section 102. The first wall 424 is slidably received by the metal ring 106. The diameters of the first wall 424 and the metal ring 106 provide a frictional interference fit to assist in retaining the metal ring 106 around the first section 102.

The hose cuff 100 further comprises a first seal 108. The first seal 108 is a generally annular or ring like member defining an interior aperture 468. In one particular embodiment, first seal 108 is generally shaped like a torus such that it has a convexly curved continuous outer surface 470. First seal 108 may generally be referred to as an O-ring having elastomeric properties. The first seal 108 is circular in cross section, having an interior diameter 472. Diameter 472 has a dimension that is greater than the radially aligned length of the second ledge 428. The diameter 472 of the cross section of the first seal 108 enables an outer tangential edge 474 of first seal 108 to extend radially outward from the terminal end 430. As will be discussed in further detail below, when the hose cuff 100 is inserted into an inlet valve, the first seal 108 may form a hermetic seal the hose cuff 100 and an inlet valve.

First seal 108 includes an inner diameter 476 measured through the longitudinal axis 116 between opposing inner tangential edges 478. The interior diameter 472 of first seal 108 is slightly greater than a diameter 434 of the first section 102 measured through longitudinal axis 116 between opposing walls 432. The first seal 108 is configured to snugly fit and nested within the second ledge 428 and the wall 432. When fit between the second ledge 428 and the wall 432, the first seal 108 causes the metal ring 106 to fit between the first ledge 422 and the first seal 108.

The second section 104 comprises a first end 480 opposite a second end 482 along the longitudinal axis 116. The first end 480 extends circumferentially around the longitudinal axis 116 and defines a first annular chamfered surface 484. The first annular chamfered surface 484 is bound by a first inner edge 486 and a first outer edge 488. The first inner edge 486 defines a first opening 490. The second end 482, which defines the second end 114 of the hose cuff 100, extends circumferentially around the longitudinal axis 116 and defines a second annular surface 492. The second annular surface 492 is bound by a second inner edge 494 and a second outer edge 496. The second inner edge defines a second opening 498. An inner surface 502 extends longitudinally from first inner edge 486 and second inner edge 494. The second annular surface 492 circumscribes longitudinal axis 116 such that a bore 500 defined by the inner surface 502 extends between the first opening 490 and the second opening 498 of the second section 104.

The bore 500 includes an upper portion 500A, a middle portion 500B, and a lower portion 500C. The upper portion 500A is adapted to slidably receive the second wall 432 of the first section 102. The upper portion 500A has a diameter 503 measured through the longitudinal axis 116 between opposing inner surfaces 502. The inner diameter 503 is slightly greater than the exterior diameter 434 of the second wall 432. The second wall 432 of the first section 102 is slidably received by the bore 500. The diameters of the second wall 432 and the bore 500 provide a frictional interference fit to assist in retaining the second wall, and thereby the first section 102, within the bore 500.

The bore 500 is in open communication with the first opening 490 of the second section 104 and the second opening 498 of the second section 104 as defined by the inner surface 502. The inner surface 502 may further include spiraling threads 504 (FIG. 2) that extend into lower portion 500C of the bore 500 and are sized to threadably connect with a portion of a hose. More particularly, the spiraling threads 504 are configured to mate with a distal end of a hose. Stated otherwise, a hose is configured to be inserted in the bore 500 of the second section 104 by inserting the distal end of the hose through the second opening 492 and releasealby and threadbly attaching second section 104 to a hose via the threads 504, which mate with an exterior portion of a hose. However, it is to be understood that in other embodiments the distal end of a hose may be attached to the hose cuff 100 by a frictional interference fit, a mechanical connection fit (i.e., a screw), or a chemical connection fit (i.e., an adhesive).

The second section 104 further comprises an annular exterior pitched or tapered wall 506. The annular exterior pitched wall 506 pitches downwardly outward from the longitudinal axis 116. The annular exterior pitched wall is pitched between the first outer edge 488 of the first annular surface 484 and a terminal end 508 of the pitched wall 506. A first ledge 510 of the second section 104 extends radially inward from the first terminal end 508 to a first wall 512. In one particular embodiment, the first wall 512 is substantially parallel to the longitudinal axis 116 and the first ledge 510 is substantially perpendicular to the longitudinal axis 116. A second ledge 514 extends radially outward from the first wall 512 to a first terminal end 516 of a second wall 518. The first ledge 510 and the second ledge 512 have substantially the same length and the first wall 512 has a length that fits the second seal 110 so that the second seal 110 nests between the first ledge 510 and the second ledge 514.

A third ledge 520 extends radially inward from the second terminal end 522 to a third wall 524. In one particular embodiment, the first wall 512, the second wall 518, and the third wall 524 are substantially parallel to the longitudinal axis 116. Additionally, the first ledge 510, the second ledge 514, and the third ledge 520, are substantially perpendicular to the longitudinal axis 116. The third ledge 522 extends in a radial manner between the second terminal end 522 a first inner corner 526. In one particular embodiment, the third ledge 520 is a continuous annular ledge having a radially aligned length between the second terminal end 522 and the first inner corner 526. The third wall 524 extends longitudinally between the first inner corner 526 and a second inner corner 528. As will be discussed in further detail below, the longitudinal length of the third wall 524 between the first inner corner 526 and the second inner corner 528 is slightly longer than a first moveable member 1102 or a second moveable member 1104 (FIG. 11) of a locking-mechanism-type inlet valve assembly that is adapted to interface with the second section 104 in a physically contacting manner. A fourth ledge 530 extends radially outward from the second inner corner 528 of the third wall 524 to a first terminal end 532 of a tapered section 534. In one particular embodiment, the fourth ledge 530 faces an opposite direction of the third ledge 520, such that the faces of the ledges 520 and 530 face each other. In one particular embodiment, as shown FIG. 4, the surface defined by the fourth ledge 530 is not continuous in as much as a portion of the second section 104 defines a longitudinally aligned slot 202. The third ledge 520, the third wall 524, and the fourth ledge 530 define an annular channel 204 configured to receive the first or second moveable member 1102, 1104 therein. The annular channel 204 extends substantially around the second section 104 concentrically about the longitudinal axis 116.

The first ledge 510, the second ledge 514, and the third ledge 520 are all annular ledges that extend circumferentially around the longitudinal axis 116 and are perpendicular to the longitudinal axis 116. The first ledge 510, the second ledge 514, the third ledge 520 and the fourth ledge 530 are concentric about the longitudinal axis 116. In this embodiment, the longitudinally aligned length of the of the first wall 512 is smaller than the longitudinally aligned length of the third wall 524 and the first ledge 510, the second ledge 514, the third ledge 520, and the fourth ledge 530 all have a similar latitudinal length. However, other dimensional configurations are possible.

Collectively, annular exterior pitched wall 506, first ledge 510, first wall 512, second ledge 514, second wall 518, third ledge 520, third wall 524, fourth ledge 530, and tapered section 534 define outer surface 537 of second section 104. The first wall 512, the second wall 518, and the third wall 524 are parallel to the longitudinal axis 116. The outer surface 537 faces radially outward from the longitudinal axis 116. In one embodiment, the second section 104 is formed from a uniform, monolithic member formed from a suitably rigid material so as to withstand deformation when the vacuum system of the present disclosure is in operation. The second section 104 may be fabricated from a polymer material, however other rigid materials are entirely contemplated such as metal. Furthermore, the integral structure of the second section 104 may be fabricated from multiple elements having similar configurations as one having skill in the art would understand.

As depicted in FIG. 2, when viewed in a cross section, the hose cuff 100 may be formed from multiple components and arranged together. The first seal 108 engages the second ledge 428 of the first section 102, the metal ring 106, and the second wall 432, and extends radially beyond the terminal end 420 of the curved wall 418. A lower tangential edge 542 of the first seal 108 engages the first annular surface 484 of the second section 104.

With continued reference to FIG. 2, the first section 102 is inserted into the metal ring 106. More particularly, the second wall 432 of the first section 102 is inserted through the first opening 448 of the metal ring 106 until the annular first surface 442 of the metal ring 106 contacts the first ledge 422 and the first wall 424. This assembly, the first section 102 and the metal ring 106, is inserted into the first seal 108 then the second section 104. More particularly, the second wall 432 of the first section 102 is inserted through the first seal 108 and the first opening 490 of the second section 104. The frictional interference fit between second wall 432 and the inner surface 502 located inside the second section 104 sandwiches, compresses, and press fits the first seal 108 and the metal ring 106 into position. The second end 410 of the first section 102 is disposed longitudinally between first inner corner 526 and second inner corner 528.

Figure 4:
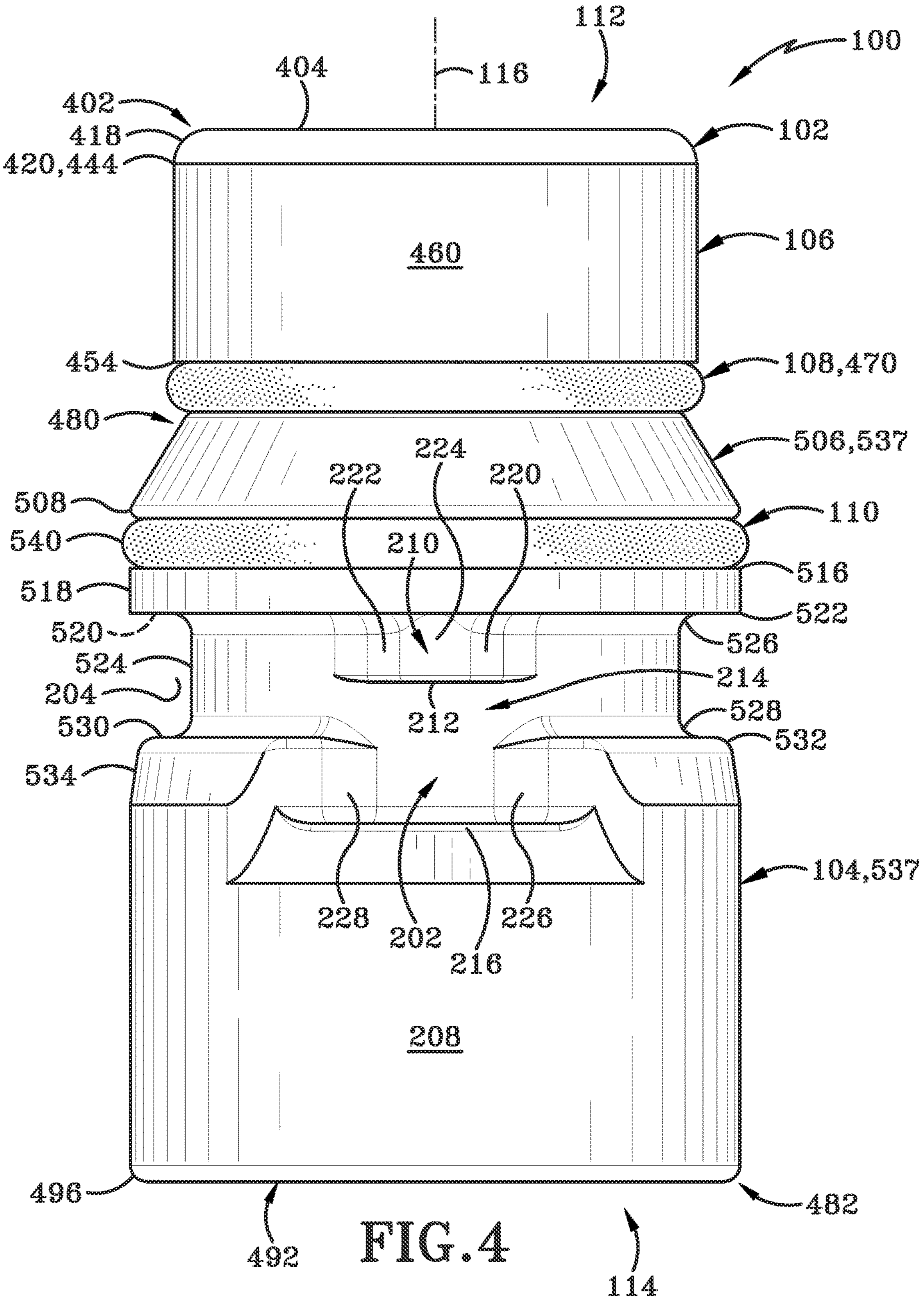
FIG. 4 is a side elevation view of the hose cuff depicted in FIG. 1.
Figure 5:
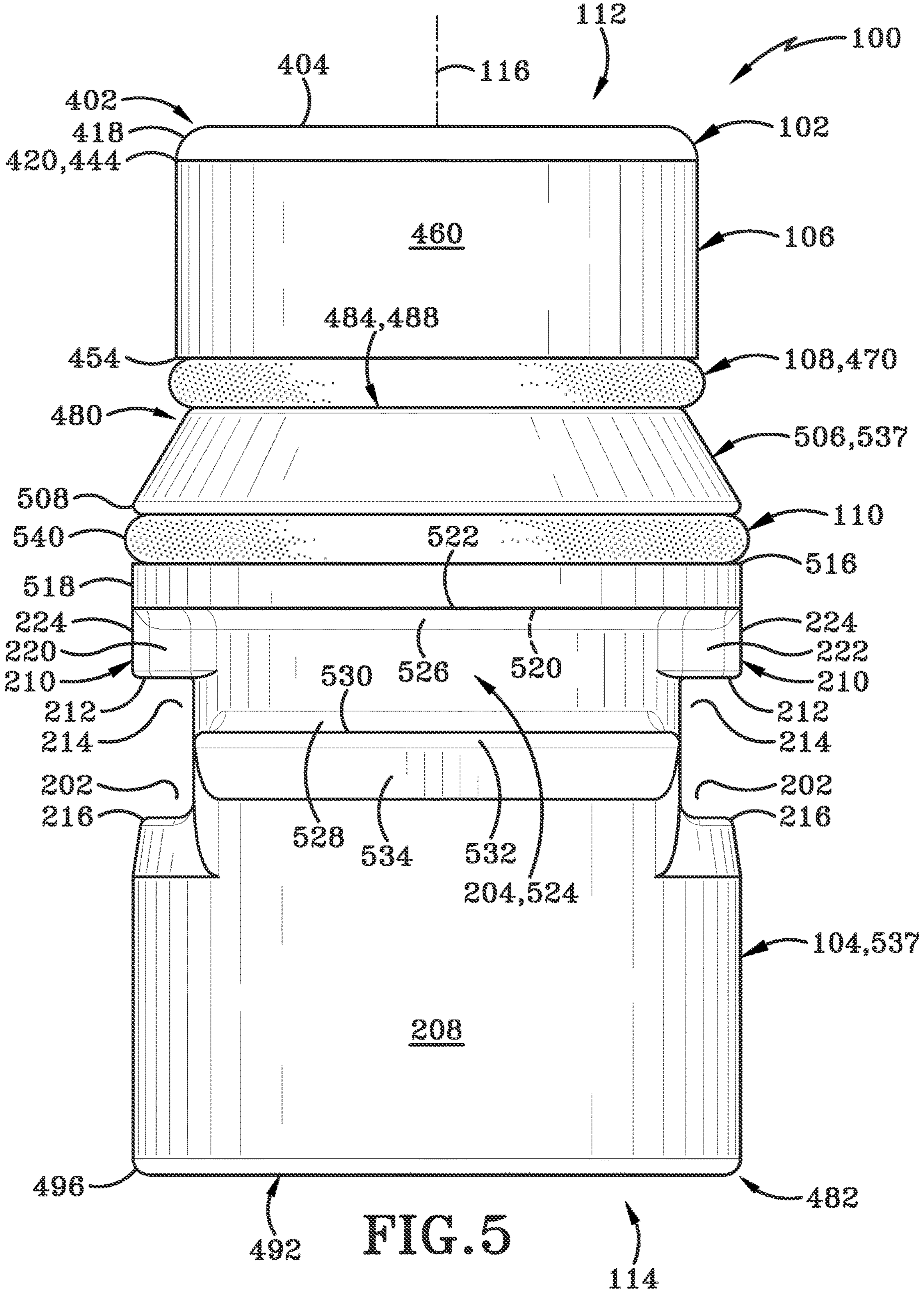
FIG. 5 is another side elevation view of the hose cuff depicted in FIG. 1.
Figure 6:
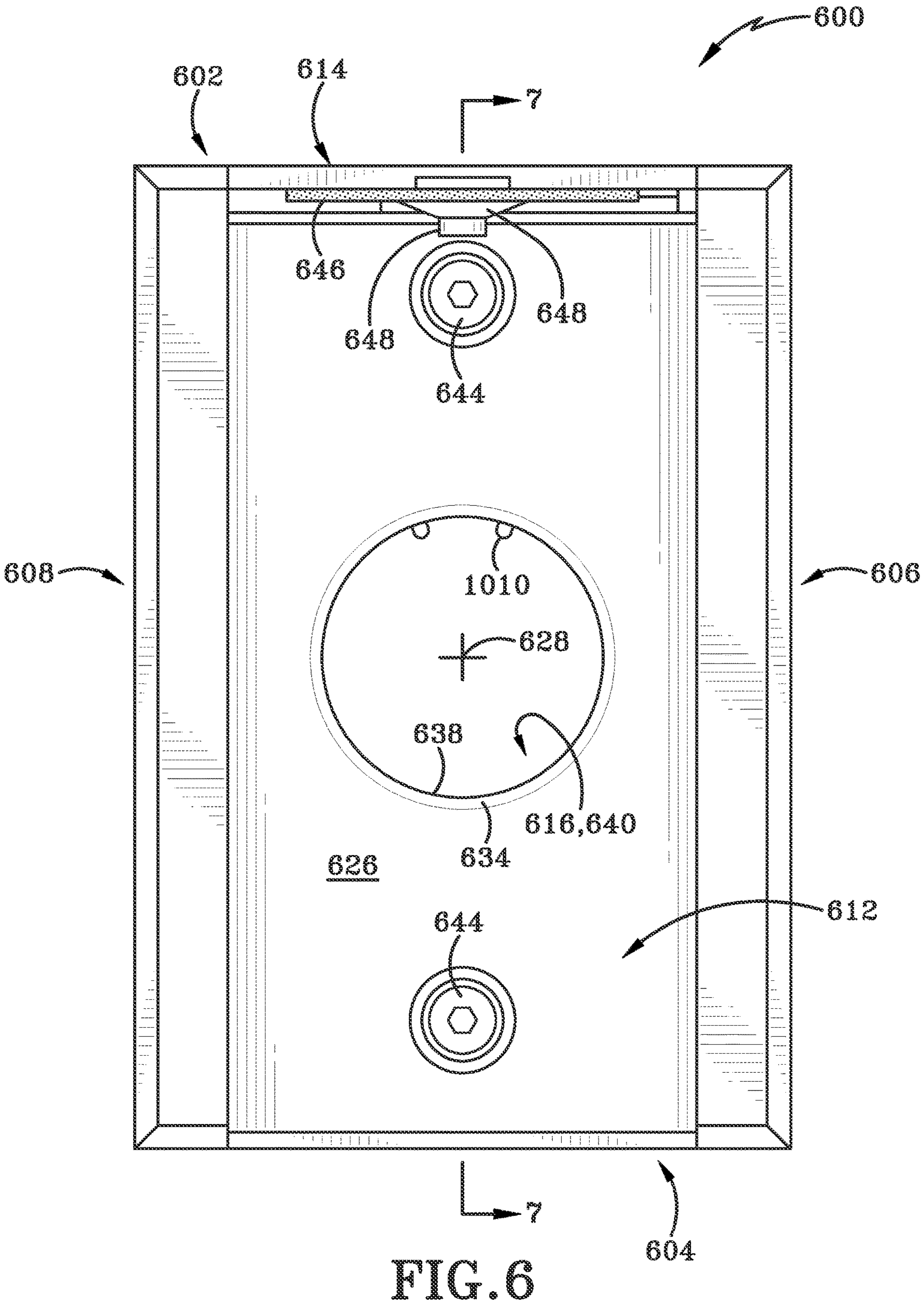
FIG. 6 is a front elevation view of an inlet valve.

As shown in FIG. 4, a tapered section 534 extends longitudinally from the first terminal end 532. The tapered section 534 joins a cylindrical fourth wall 208 to extend generally longitudinal and parallel to the longitudinal axis 116 toward the second end 482. In one particular embodiment, the tapered section 534 is angled relative to the longitudinal axis 116 in a range from about one to about ten degrees. A first cam 210 extends radially outward from the longitudinal axis 116. First cam 210 is positioned within the annular channel 204. First cam 210 is connected with the third wall 524 and includes a lower edge 212 that is positioned between the third ledge 520 and the fourth ledge 530. Accordingly, a portion 214 of the annular channel 204 extends continuously below the lower edge 212 of the first cam 210 and above the fourth ledge 530. The portion 214 of the annular channel 204 extending below the edge 212 is in open communication with the slot 202 relative to the longitudinal axis. The slot 202 extends towards the second end 482 to a lower ledge 216. The first moveable member 1102 or the second moveable member 1104 is able to bypass the first cam 210 and slide down into the slot 202 by crossing through the portion 214 of the annular channel 204 that is positioned below the lower edge 212 and above the fourth ledge 212.

The first cam 210 includes mirroring sloped surfaces. More particularly, the first cam includes a first sloped surface 220 and a second sloped surface 222. In one particular embodiment, the first sloped surface 220 and the second sloped surface 222 are convexly curved between an apex 224 of the first cam 210. In another particular embodiment, the first sloped surface 220 and the second sloped surface 222 are concavely curved between the apex 224 and the third wall 524. The apex 224 may define a convexly curved protrusion configured to depress the moveable member 1102, 1104 retained within an inlet valve assembly.

The second section 104 may further include a first sloped wall 226 and a second sloped wall 228 extending adjacent to the longitudinal slot 202. The first sloped wall 226 and the second sloped wall 228 extend along the slot 202 and are positioned below the fourth ledge 530 when viewed from the side. In one particular embodiment, the first sloped wall 226 and the second sloped wall 228 are positioned along a similar longitudinal dimension as the tapered section 534. Stated otherwise, the tapered section 534 is interrupted by the first sloping wall 226 and the second sloping wall 228 which are sloped radially inward towards the third wall 524 in order to define slot 202 collectively with the lower ledge 216. In one particular embodiment, the first sloped wall 226 and the second sloped wall 228 may be concavely curved, may have a flat slope, or may be convexly curved. Lower ledge 216 is longitudinally aligned with the first cam 210.

In one particular embodiment, the second section 104 is formed from a uniform, monolithic member formed from a suitably rigid material so as to withstand deformation when the vacuum system of the present disclosure is in operation. Second section 104 may be fabricated from a polymer material; however other rigid materials are entirely contemplated such as metal. Furthermore, the integral structure of the second section 104 may be fabricated from multiple elements having similar configurations as one having skill in the art would understand.

The hose cuff 100 further comprises a second seal 110. In one particular embodiment, the second seal 110 comprises substantially the same material and has substantially the same shape as the first seal 108. That is, the second seal 110 is generally annular or a ring like member defining an interior aperture (not shown). In this embodiment, the second seal 110 is generally shaped like a torus such that it has a convexly curved continuous outer surface and may generally be referred to as an O-ring having elastomeric properties. The second seal 110 is circular in cross section having an interior diameter 538. Diameter 538 has a dimension that is greater than the radially aligned length of the first ledge 510 and the second ledge 514.

The second seal is configured to snugly fit and nest between the first ledge 510 and the second ledge 514. Furthermore, the diameter 538 of the cross section of the second seal 110 enables an outer tangential edge 540 of the second seal 110 to extend radially outward from the terminal end 508 of the pitched wall 506 and extend radially outward from the first terminal end 516 of the second wall 518. When the hose cuff 100 of the hose assembly is inserted into an inlet valve assembly, the second seal may form a proper seal between the hose cuff 100 and the inlet valve assembly.

FIGS. 6-10 depict a pin-type inlet valve 600. Notably, inlet valve 600 is one exemplary type of secondary valve that is use in whole home central vacuum systems having a primary valve that stores the vacuum hose within or behind a wall of the structure. The pin-type inlet valve 600 is utilized as part of the central vacuum system and there may typically be a plurality of these secondary pin-type inlet valve 600 located throughout the structure. The pin-type inlet valve 600 is structured to cooperatively engage hose cuff 100 at the first section 102 when a hose is connected to the pin-type inlet valve 600 to effectuate vacuum cleaning in one of the rooms of a structure.

The pin-type inlet valve 600 includes a first end 602 opposite second end 604 and a first side 606 opposite second side 608. In one particular embodiment, the first end 602 is positioned vertically above the second end 604 such that the first end 602 may be considered a top end and the second end 604 may be considered a bottom end. However, it is to be entirely understood that the first end 602 and the second end 604 may be inverted such that the first end 602 is positioned vertically below the second end 604. The pin-type inlet valve 600 includes a substantially rigid frame 610, a plate 612, and a cover 614.

The plate 612 defines a central aperture 616. A cylindrical coupler 618 extends through the aperture 616 defined by the plate 612. The coupler 618 includes a terminal end 620 selectively coupled with a hose 622 which is in open communication with a tube or conduit that is connected to a vacuum source. The coupler 618 includes a forward end 624. The forward end 624 extends beyond the rigid frame 610 and rests against an inner surface 626 of the plate 612. The terminal end 620 of the coupler 618 extends circumferentially around an axis 628 and defines a first inner annular edge 630 defining a first opening 632 of the coupler 618. The forward end 624 of the coupler 618 extends circumferentially around the axis 628 and defines a second inner annular edge 634 defining a second opening 636 of the coupler 618. An inner surface 638 extends from first inner annular edge 630 to the second inner annular edge 634. The first inner annular edge 630, the second inner annular edge 634, and the inner surface 638 define a first bore 640. The first bore 640 is in open communication with the aperture 616 and the hose 622.

The plate 612 may be connected to the frame 610 by a connector 642, such as a screw. In one particular embodiment, there may be a plurality of connectors 642 extending through plate 612 into the frame 610.

Figure 7:
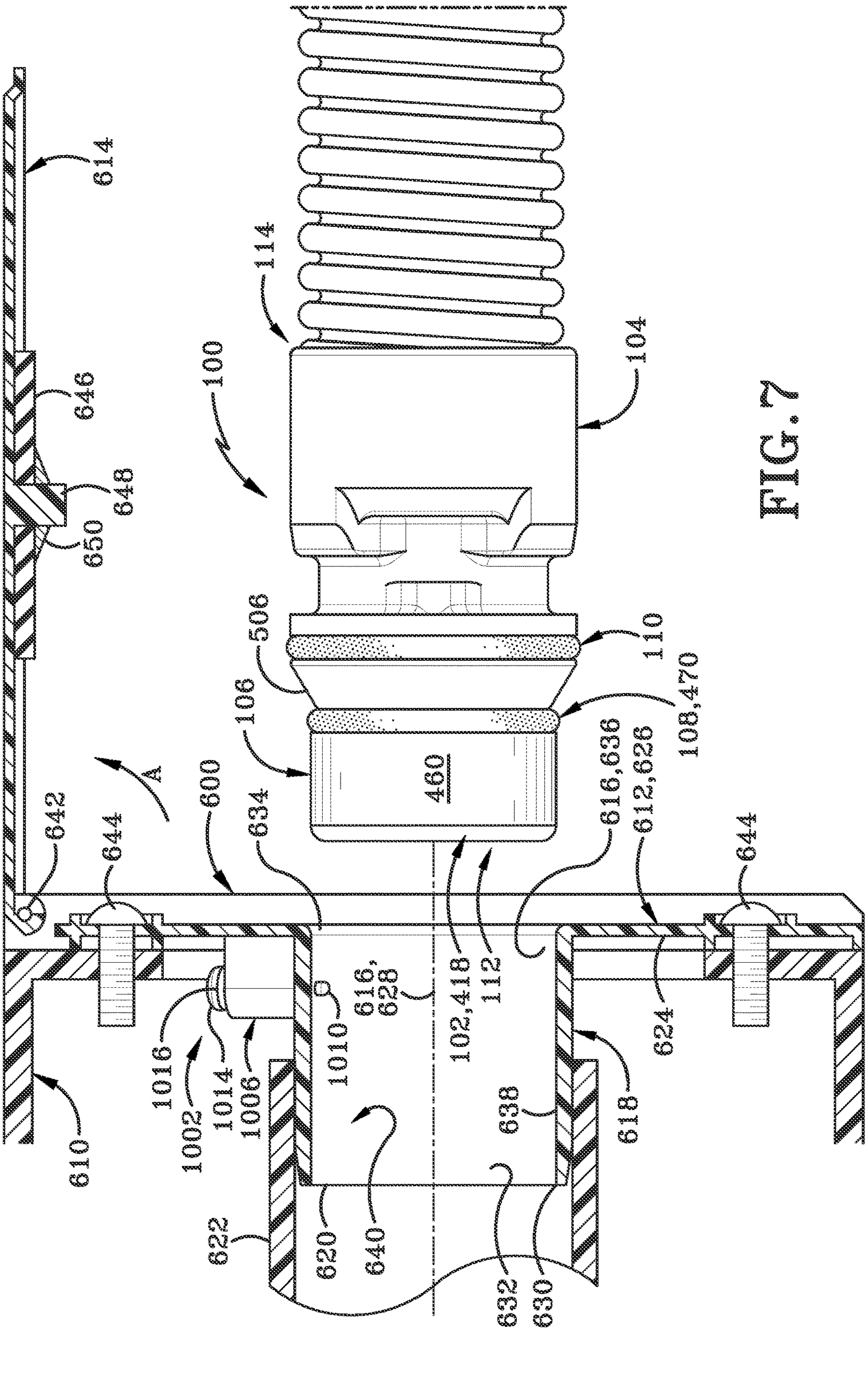
FIG. 7 is an operational view depicting the inlet valve of FIG. 6 in a cross section view with a hose taken along line 7-7 in FIG. 6.

FIG. 7 depicts a hose assembly connected to the hose cuff 100 and the inlet valve assembly 600. In one embodiment, the hose assembly is a retractable hose assembly. In this embodiment, the hose assembly is storable within a conduit of a central vacuum system. The conduit may be located behind or within a wall of a structure that houses the central vacuum system. In this embodiment, a user first removes the hose assembly from a primary valve box that is in communication with the conduit. When fully removed, the hose assembly may be used with the inlet valve assembly 600. As depicted in FIG. 7, cover 614 is pivotably connected with plate 612 via a pivot pin 644 defining an axis about which the cover 614 pivots relative to the plate 612. The pivot pin 644 may be in operative connection with a spring mechanism that maintains the cover 614 in a position that is perpendicular to the axis 628, hereinafter referred to as a closed position. The spring induced force that maintains the cover 614 in the closed position may be overcome by a physical manipulative force of a user pivoting the cover 614 about the pivot pin 644 in the direction of arrow D to a second location that is parallel to the axis 628, hereinafter an open position. Thus, the cover 614 is moveable or pivotable between an open position (FIG. 7) and a closed position.

The cover 614 carries an annular seal 646 that extends around a protrusion 638 that is secured with a cap 650. When the cover 614 is in the closed position (as shown in FIG. 7), the seal 646 covers the aperture 616 to seal the aperture 616. The seal 646 rests against the plate 612 and, more particularly, the portion of plate 612 that is in line with the aperture 616.

Figure 8:
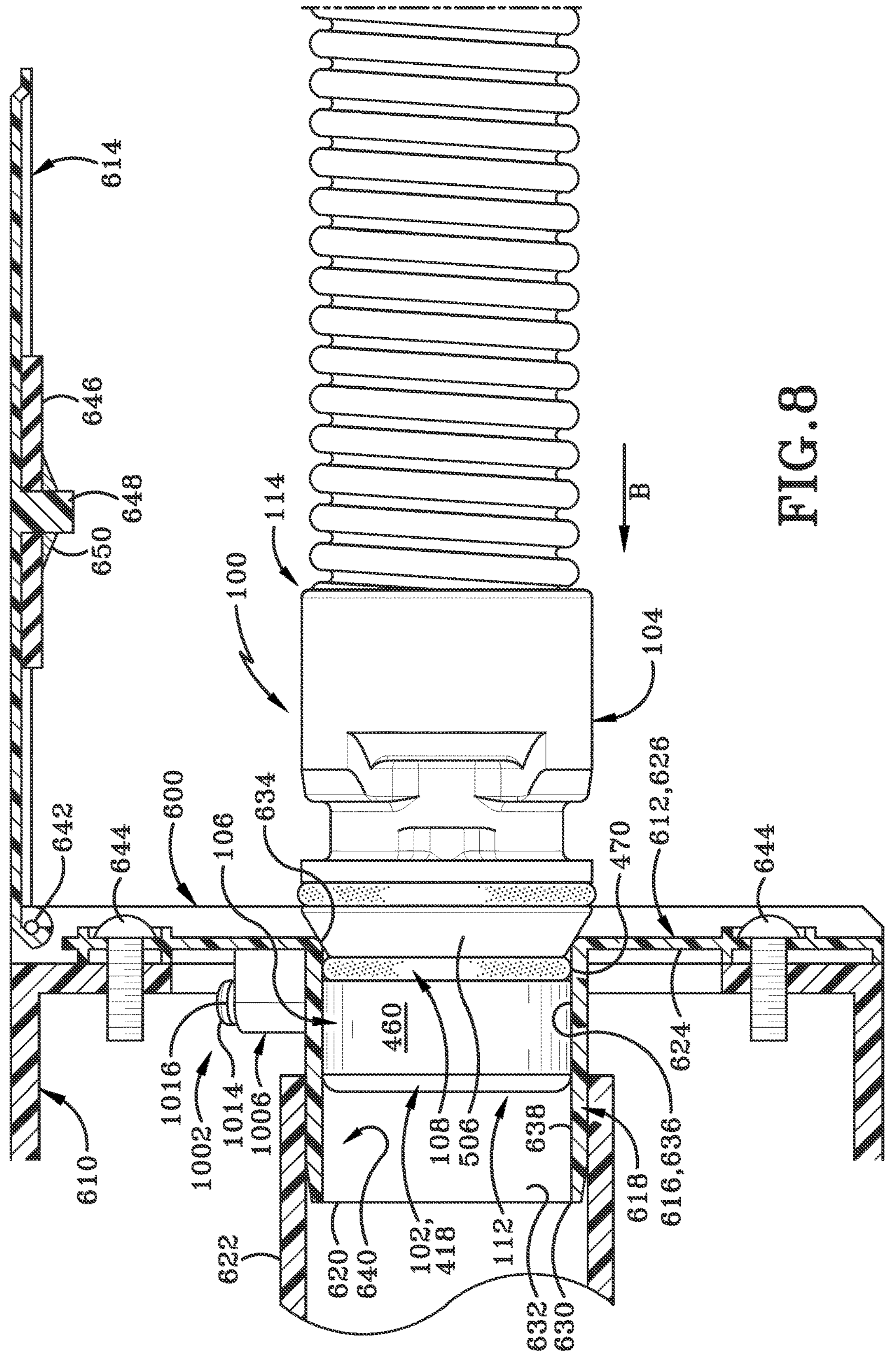
FIG. 8 is an operational view depicting an inlet valve of FIG. 6 in a cross section view with a hose connected thereto.

As shown in FIG. 8, a generally hermetic seal is formed between the inner surface 638 and the first seal 108. This creates an open vacuum channel through the hose cuff 100 with hose 622. Furthermore, the pitched wall 506 contacts the aperture 616. This contact provides additional support and an additional seal between the hose cuff 100 and the inlet valve 600.

Figure 9:
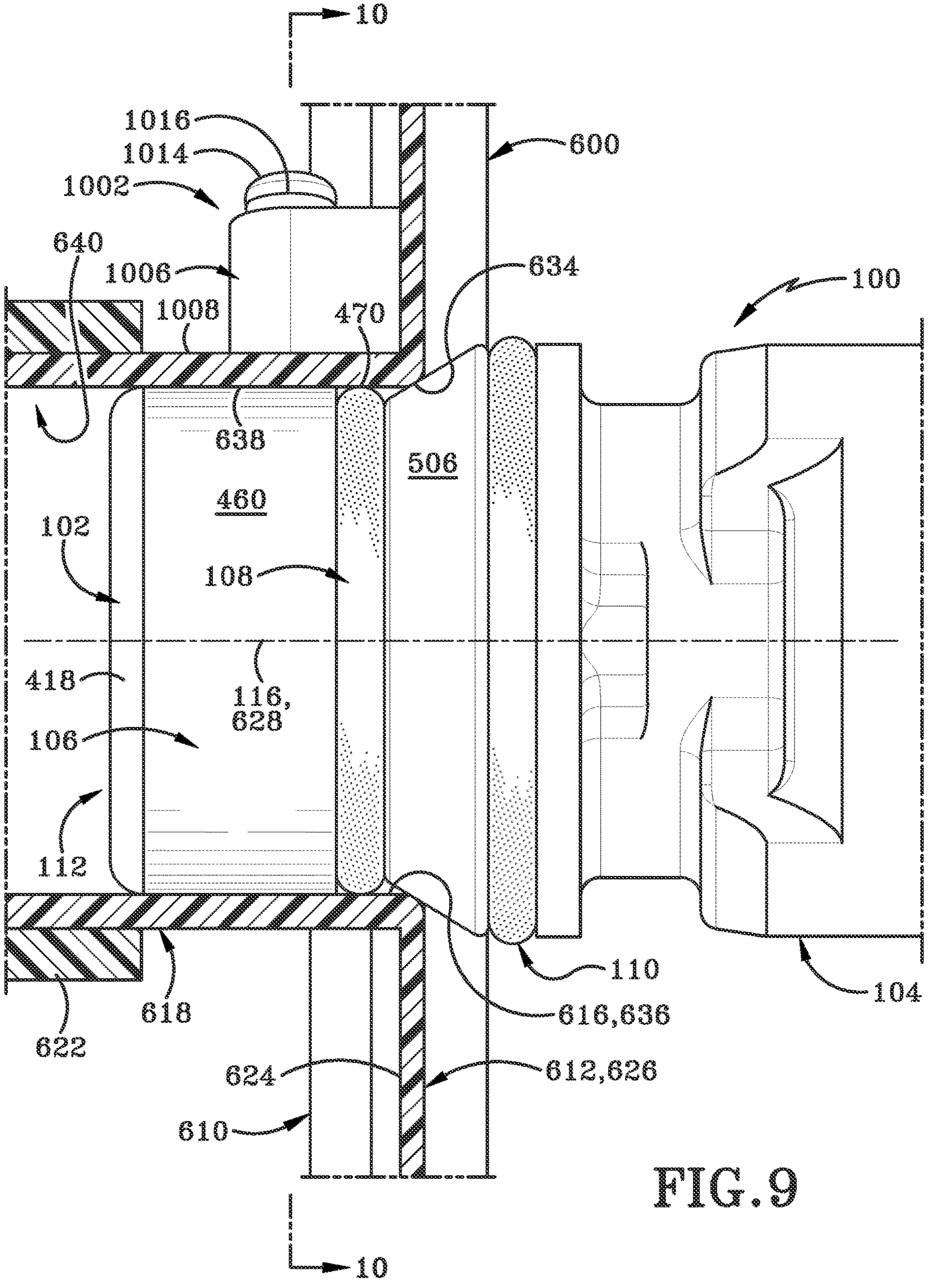
FIG. 9 is an enlarged cross section view depicting an inlet valve of FIG. 6 in a cross section view with a hose connected thereto.
Figure 10:
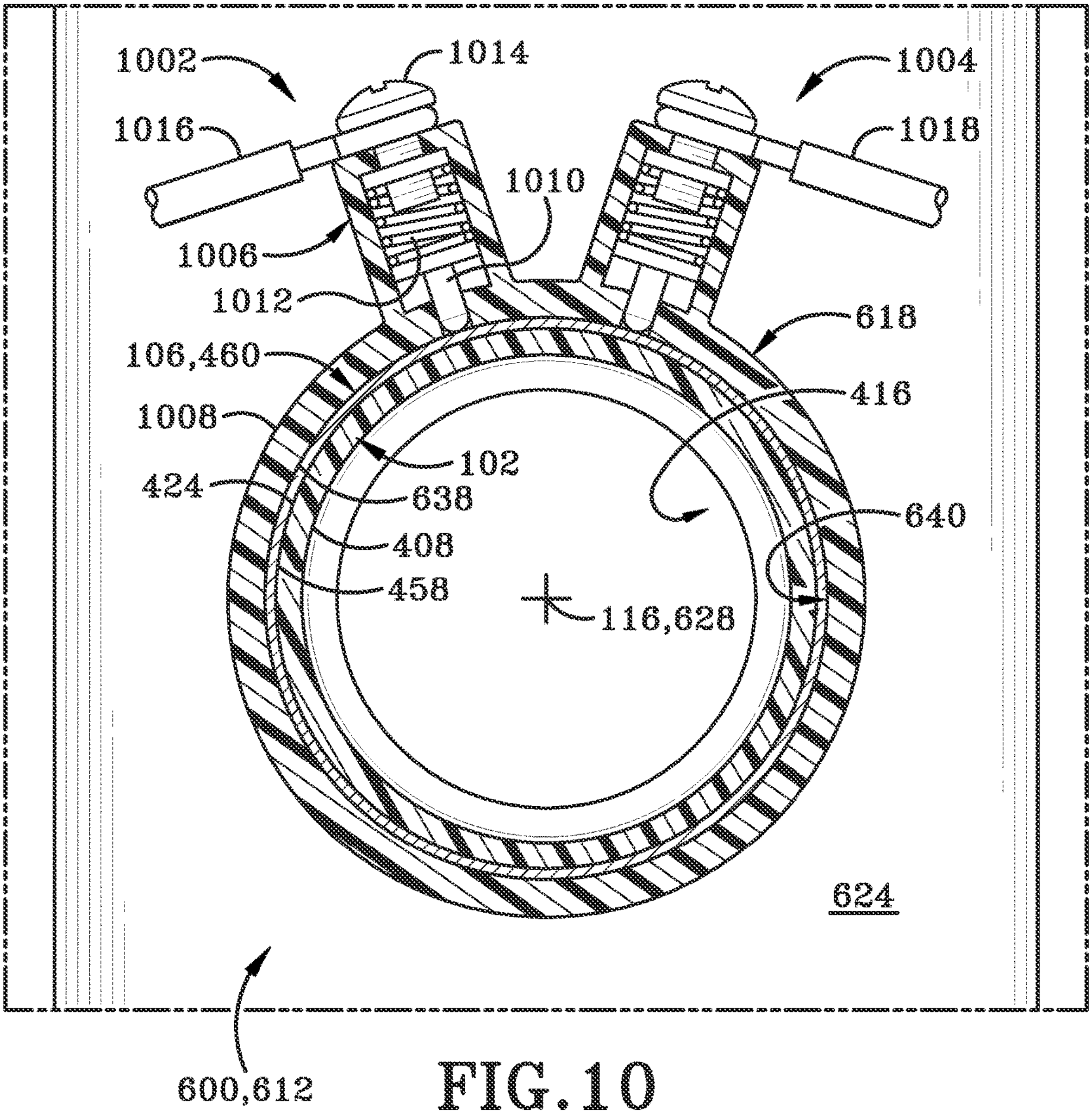
FIG. 10 is a cross section view taken along line 10-10 depicting an inlet valve of FIG. 6 with a hose cuff connected thereto.

In operation, and as depicted in FIGS. 8-10, the hose cuff 400 is configured to connect with the secondary valve 600. When the cover 614 is in the open position such that the aperture 616 is exposed, the hose cuff 400 is moved in the direction of arrow E towards the aperture 616 until the metal ring 106 of the hose cuff contacts two metal pins. As will be discussed in further detail below, this contact completes an electrical circuit, which turns on a vacuum system.

FIG. 10 depicts a first electrical connection assembly 1002 and a second electrical connection assembly 1004. The first electrical connection assembly 1002 and the second electrical connection assembly 1004 are structurally identical. Accordingly, for brevity, similar reference numerals on the first electrical connection assembly 1002 refer to similar elements on the second electrical connection assembly 1004. A first cylinder 1006 extends from an outer side 1008 of the coupler 618. The first cylinder 1006 includes a first end and a second end opposite the first. The first end is defined by a first annular surface. The first annular surface defines a first opening. A first inner wall extends from the first opening to an opposing second opening within the first cylinder 1006. The second opening is defined by a second annular surface which is opposite the first annular surface. The first opening, the first inner wall, and the second opening define a second bore.

A second inner wall extends from the second annular surface to an opposing third opening. The third opening is defined by a third annular surface of the outer side of the coupler 618. The second opening, the second inner wall, and the third opening define a third bore.

A third inner wall extends from the third annular surface to an opposing fourth opening. The fourth opening is defined by an annular edge on the inner surface 638 of the coupler 618. The third opening, the fourth opening, and the fourth annular edge 1036 define a fourth bore. The fourth bore is in open communication with the first bore 640 and the third bore. The second bore is in open communication with the third bore. Hence, the second bore is in open communication with the first bore.

The fourth bore has a diameter that is slightly greater than a diameter of a pin 1010. The pin 1010 extends from the first bore 640 into the fourth bore. When the spring is compressed, as shown in FIG. 10, the pin 1010 further extends into the third bore. The third bore has a diameter that is slightly greater than a diameter of a first connector, a spring 1012, and a second connector. When the spring 1012 is not compressed, a second side of the first connector rests upon the third annular surface. A first side of the first connector contacts a second end of the spring 1012. A first end of the spring 1012 contacts a second side of the second connector.

The second bore has a diameter that is slightly greater than a diameter of a neck of a screw 1014. The screw 1014 extends into the third bore and threadably connects with the second connector so that a first side of the first connector contacts the second annular surface. A second surface of a first wire 1016 rests upon first annular surface. A first surface of the first wire 1016 contacts a head of the screw 1014. The first wire 1016 is mechanically coupled to screw 1014. The first wire 1016 is in electrical communication with an anode of an electrical circuit and a second wire 1018 is in electrical communication with a cathode of an electrical circuit.

As depicted in FIGS. 8-10, when the hose cuff 100 is inserted into the aperture 616, the metal ring 106 contacts the pins 1010. Such contact forces the pins 1010 into the third bore and compresses the spring 1012. This contact completes electrical circuit between the pins 1010 and therefore between first wire 1016 and the second wire 1066. When the circuit is completed, a vacuum of a central vacuum system turns on.

As depicted in FIG. 9, when it is time to release the hose cuff 100 from the inlet valve 600, the hose cuff 100 pulled in a direction opposite arrow B in FIG. 8. When the metal ring 106 no longer contacts one of the pins 1010, the electrical circuit is broken and the vacuum system is turned off.

Figure 11:
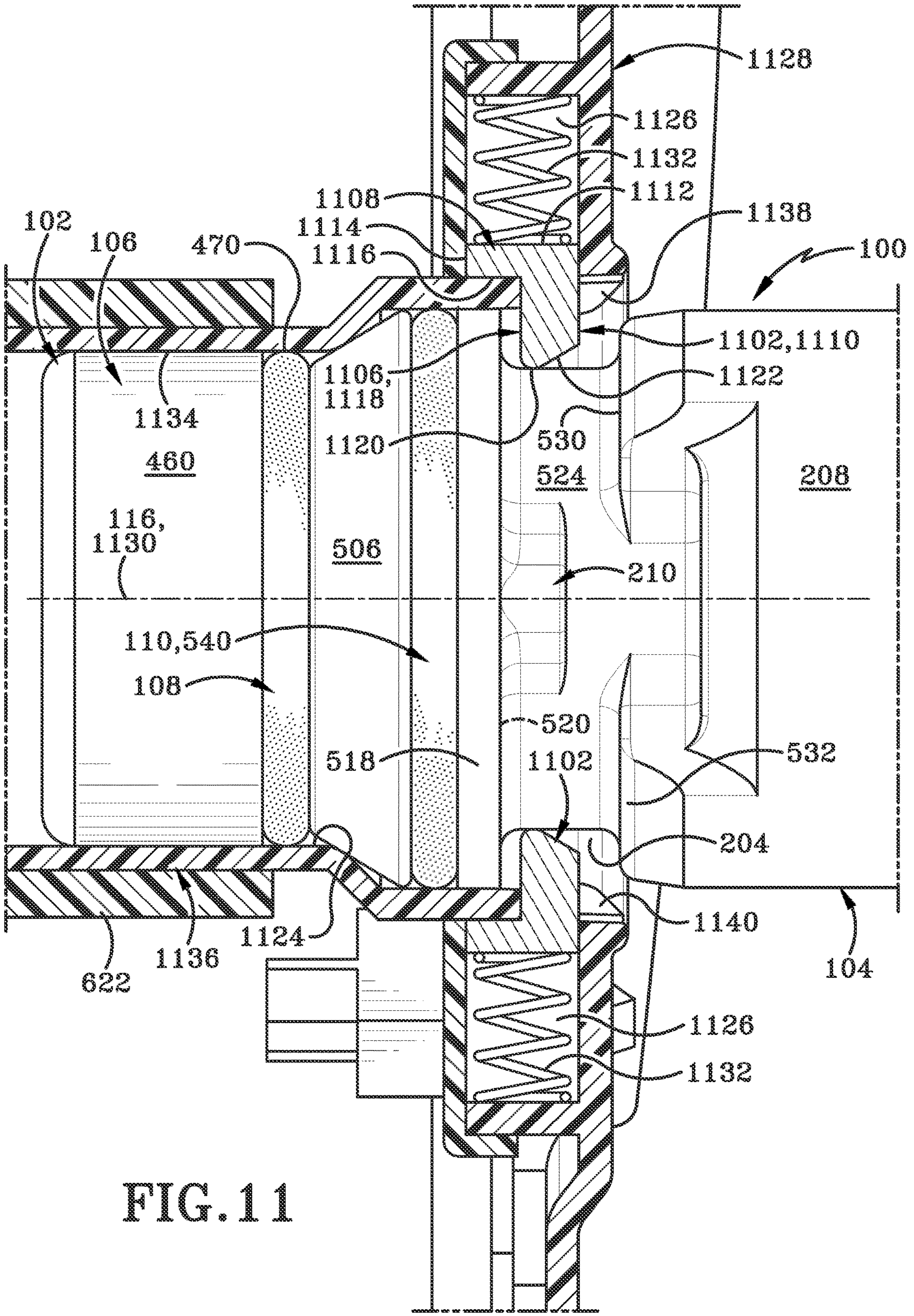
FIG. 11 is an enlarged cross section view of an inlet valve and a hose cuff connected thereto.

FIG. 11 depicts a hose cuff that may be connected to a hose assembly and a locking-mechanism inlet valve 1100. In one embodiment, the hose assembly the hose assembly may be a retractable hose assembly. In this embodiment, the hose assembly is storable within a conduit of a central vacuum system. The conduit may be located within a wall of a structure that houses the central vacuum system. In this embodiment, a user first removes the hose assembly from a valve box that is in communication with the conduit. When fully removed, the hose assembly may be used with the inlet valve 1100. Furthermore, the inlet valve assembly 600 and the inlet valve 11100 may be located in the same structure with a same central vacuum system. In this embodiment, wherein the hose assembly is a retractable hose assembly, a user may remove the hose assembly from a valve box and use the hose assembly with either the inlet valve assembly 600 or the inlet valve 1100.

The locking-mechanism inlet valve 1100 is utilized as part of a central vacuum system and there may typically be a plurality of locking-mechanism inlet valves 1100 located throughout a structure. The locking-mechanism inlet valve 1100 is structured to cooperatively engage hose cuff 100 at the second section 104 when a hose is connected to the locking-mechanism inlet valve 1100 to effectuate vacuum cleaning in one of the rooms of a structure.

FIG. 11 depicts the hose cuff 100 being inserted into the locking-mechanism inlet valve 1100. More particularly, FIG. 11 depicts the first moveable member 1102 and the second moveable member 1104; however, it is to be understood that the second moveable member 1104 is structured similarly to the first moveable member 1102 and its duplicate description is not provided for brevity. The moveable member 1102 includes a plurality of surfaces that will be described separately; however, it is to be understood that the moveable member 1102 is a singular monolithic unitary member. Generally, the moveable member is an L-shaped member having a first leg 1106 and a second leg 1108 orthogonal to the first leg 1106. The orientation of the first leg 1106 and the second leg 1108 defines an upper surface 1110, a rear surface 1112, a first lower surface 1114, a frontal surface 1116 and a second lower surface 1118. A forward portion of the moveable member 1102 is defined by two concavely curved surfaces. Namely, a first concavely curved surface 1120 and a second concavely curved surface 1122. The second concavely curved surface 1122 may be concavely curved chamfer between the first concavely curved surface 1120 and the top surface 1110. A port 1124 may be 360 degrees in cross section. An angle of an arc defined by the first concavely curved surface 1120 on the pin that is in a range from 15 degrees to 45 degrees relative to the port. When there is a second moveable member 1104 or a second pin that is shaped similarly to the first pin (i.e., first moveable member 1102), an angle of arc defined by a first concavely curved surface on the second pin or second moveable member 1104 is in a range from 15 degrees to 45 degrees relative to the port 1124.

The height of the movable member 1102 measured from the top surface 1110 to the lower surface 1114 approximates the width of a bore 1126 such that the top surface 1110 and the lower 1114 are in close contact or closely adjacent inner surfaces that define the bore 1126. In one particular embodiment, the inner surfaces may be defined by a portion of a plate 1128. In another particular embodiment, other portions of pieces of the secondary valve assembly may define portions of the bore 1126. The longitudinal length of the movable member 1102 may be measured from its rear end 1112 to the first concavely curved surface 1120, which defines the greatest length of the movable member. Effectively, the length of the movable member is defined by the first leg 1106. The length of the movable member measured between the rear end 1112 and the first concavely curved surface 1120 is less than the longitudinal length of the bore 1126. Thus, when movable member 1102 is moved radially relative to a longitudinal axis 1130 the length of travel is limited by a spring 1132 such that the first leg 1106 does not fully enter the bore 1126. Stated otherwise, the first concavely curved surface 1120 and the second concavely curved surface 1122 may be pushed radially outward against the biasing force of the spring 1132 to allow the hose cuff 100 to be inserted into the valve assembly 1100 but without permitting the first concavely curved surface 1120 to fully enter the bore 1126. Stated otherwise, the first concavely curved surface 1120 would lie approximately flush with an inner surface 1134 of the cylindrical member 1136. By ensuring that the lower wall 1118 lies flush against the thickness of the cylindrical member 1136 and the height of the movable member 1102 approximates the width of the bore 1126, the movable member may be stabilized within the bore so as to reduce the likelihood of the movable member twisting or rotating to ensure that the bore 1126 is locked in position. Stated otherwise, the L-shaped configuration of the movable member 1102 prevents the movable member from rotating during longitudinal movement of the hose cuff 100 and rotational movement of the hose cuff 100 relative to longitudinal axis 1130 of the valve assembly 1100.

FIG. 11 further depicts the hose cuff 100 being inserted into the inlet valve assembly 1100. When the hose cuff 100 is inserted into the port 1124, the second concavely curved surface 1122 defined by the chamfer allows the end of the hose cuff 100 to be pushed radially outward against the compression force of the springs 1132. Once the hose cuff 100 has been inserted far enough along the longitudinal axis 1130, the moveable members may be urged radially inward towards the longitudinal axis 1130 such that the first and second concavely curved surfaces 1120, 1122 are disposed within the channel defined by the end of the hose. When the moveable members are locked into position, the frontal surface 1116 rests against the exterior surface of the cylindrical member 1136. Additionally, the second lower surface 1118 is positioned against a wall defined by the thickness of the cylindrical member 1136. The first leg 1106 extends through a cutout 1138. Similarly, the first leg 1106 on the second moveable member 1104 extends through a second cutout 1140 diametrically opposite the longitudinal axis 1130.

In operation, there is a step of inserting the hose cuff 100 coupled with a vacuum hose into the secondary valve 1100 of a central vacuum system. Then, moving the first concavely curved surface 1120 and the second concavely curved surface 1122 of the moveable member 1102 radially relative to the axis 1130 of the secondary valve 1100. Thereafter connecting, in a releasable manner, the hose cuff 100 to the moveable member 1104 to position the first concavely curved surface 1120 of the moveable member 1102 in an annular channel defined by the hose cuff. Moving the first concavely curved surface 1120 of the moveable member 1102, may be accomplished by sliding the moveable member 1104 linearly radially.

An embodiment of a central vacuum system may include a radio frequency (RF) system. In this embodiment, the hose cuff 100 may include a metal portion and a nonmetal portion that are each adapted to contact the pins 1010. When the hose cuff 100 is inserted into a pin-type inlet valve 600, at least one pin 1010 may contact the nonmetal portion. As a result, an electrical circuit is not completed between two pins 1010 and the central vacuum cleaning system may not automatically turn on when the hose cuff 100 is inserted into a pin-type inlet valve 600. As will be discussed in further detail herein, if one or both pins 1010 do not contact metal, the central vacuum system may be controlled remotely by the RF system.

Figure 12:
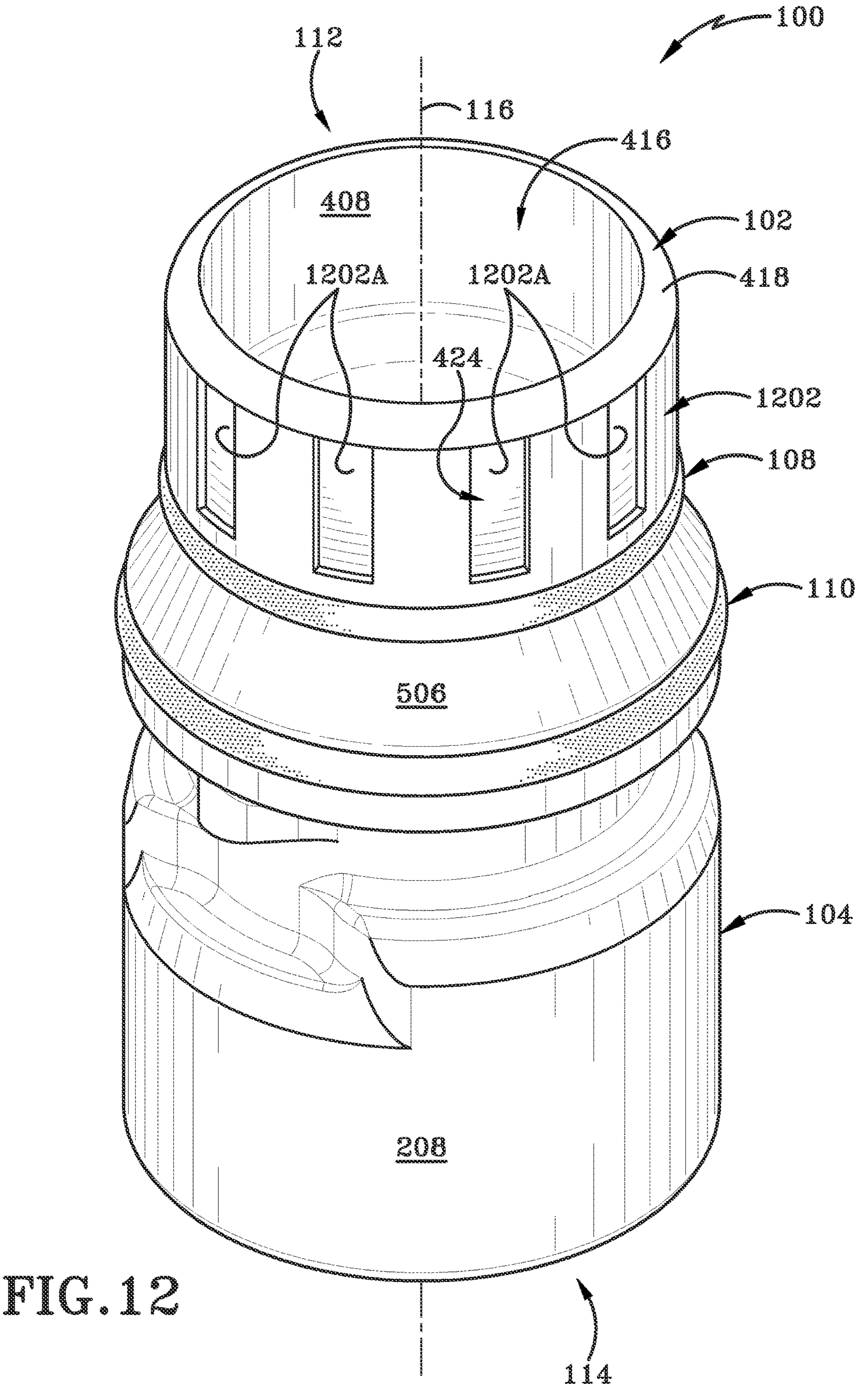
FIG. 12 is a perspective view of a hose cuff with another exemplary embodiment of a metal ring of the present disclosure.

FIG. 12 depicts the hose cuff 100 with a second metal ring 1202. The second metal ring 1202 extends 360° around the first section 102 of the hose cuff 100 and defines a plurality of notches 1202A. The plurality of notches 1202A extend entirely through the second metal ring 1202 thereby exposing the first wall 424 of the hose cuff 100. The hose cuff 100 with the second metal ring 1202 may be inserted into a pin-type inlet valve 600 at a first position or a second position. At the first positon, both of the pins 1010 of the pin-type inlet valve 600 may contact the second metal ring 1202 thereby completing an electrical circuit between the pins 1010 which automatically turns on the central vacuum system. At the second position, at least one of the pins 1010 does not contact the second metal ring 1202. In this second position, at least one of the pins 1010 extends through one of the notches 1202A and may contact the first wall 424 of the hose cuff 100. The first wall 424 may be formed of a plastic or another nonmetallic material. Accordingly, when one of the pins 1010 contacts the first wall 424 or otherwise extends through a notch 1202A and does not contact the second metal ring 1202, there is no electrical connection between the two pins 1010 and the central vacuum system is turned off allowing the central vacuum system to be controlled remotely by an RF system. Furthermore, the hose cuff 100 with the second metal ring 1202 may be inserted into a locking-mechanism inlet valve 1100. When inserted into the locking-mechanism inlet valve 1100, the central vacuum system remains off allowing the central vacuum system to be controlled by an RF system of the central vacuum system.

In one example, the hose cuff 100 with the second metal ring 1200 may be inserted into a pin-type inlet valve 600 at the first positon as discussed herein. In this positon, the central vacuum system automatically turns on. In this example, a user may desire to remotely control the central vacuum system with an RF system of the central vacuum system. To do so, the user may rotate the hose cuff 100 from the first position to the second position as described herein. At the second position, at least one of the pins 1010 does not contact the second metal ring 1202 and the central vacuum system is turned off which allows the central vacuum system to be controlled by an RF system of the central vacuum system.

In another example, the hose cuff 100 with the second metal ring 1200 may be inserted into a pin-type inlet valve 600 at the second positon as described herein. In this second position, the central vacuum system may remain off when the hose cuff 100 is inserted into the pin-type inlet valve 600. In this example, a user may desire to automatically turn on the central vacuum system. Accordingly, the user may rotate the hose cuff 100 from the second position to the first position as described herein. At the first positon, both of the pins 1010 contact the second metal ring 1202 thereby turning on the central vacuum system.

In yet another example, the hose cuff 100 with the second metal ring 1200 may be inserted into a locking-mechanism inlet valve 1100 of a central vacuum system. In this example, when the hose cuff 100 with the second metal ring 1200 is inserted into the locking-mechanism inlet valve 1100, the central vacuum system may remain off which allows the central vacuum system to be controlled by an RF system of the central vacuum system.

Figure 13:
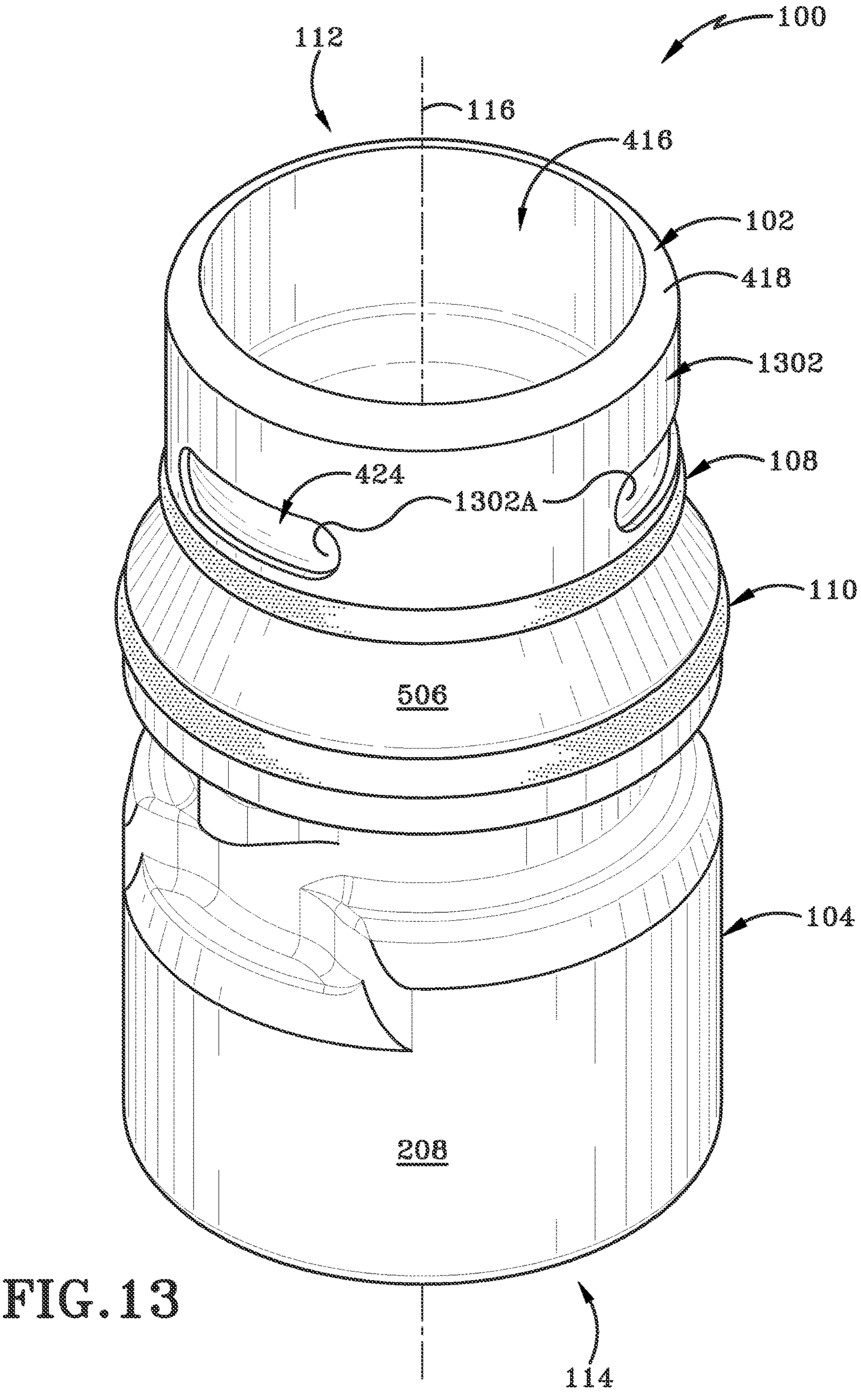
FIG. 13 is a perspective view of a hose cuff with another exemplary embodiment of a metal ring of the present disclosure.

FIG. 13 depicts the hose cuff 100 with a third metal ring 1302. The third metal ring 1302 extends 360° around the first section 102 and defines a plurality of oblong apertures 1302A that extend entirely through the third metal ring 1302 thereby exposing the first wall 424 of the hose cuff 100. The first wall 424 may be formed of a plastic or another nonmetallic material.

The hose cuff 100 with the third metal ring 1302 may be inserted into a pin-type inlet valve 600 at a first positon or a second position. At the first positon, both pins 1010 may contact the third metal ring 1302 thereby turning on a central vacuum system as described herein. At the second position, at least one of the pins 1010 may extend through one of the plurality of oblong apertures 1302A and may contact the first wall 424. When the at least one of the pins 1010 contacts the first wall 424 or otherwise extends through an oblong aperture 1302A and does not contact the third metal ring 1302, there is no electrical connection formed between the pins 1010 which keeps the central vacuum system off and allows the central vacuum system to be controlled by an RF system of the central vacuum system. The hose cuff 100 with the metal ring 1302 is rotatable between the first position and the second positon. Furthermore, the hose cuff 100 with the third metal ring 1302 may be inserted into a locking-mechanism inlet valve 1100. When inserted into the locking-mechanism inlet valve 1100, the central vacuum system remains off allowing the central vacuum system to be controlled by an RF system of the central vacuum system.

Figure 14:
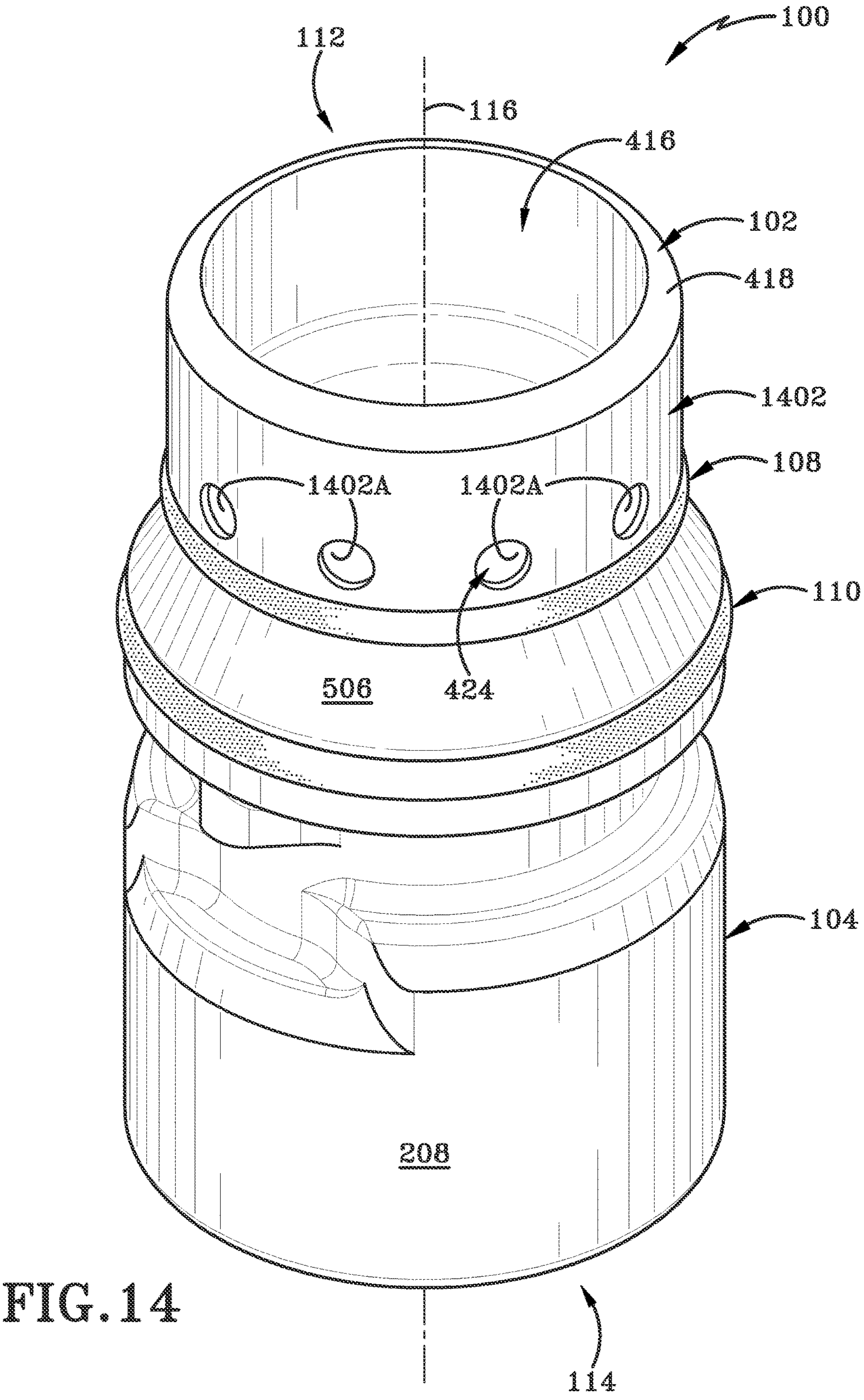
FIG. 14 is a perspective view of a hose cuff with another exemplary embodiment of a metal ring of the present disclosure.

FIG. 14 depicts the hose cuff 100 with a fourth metal ring 1402. The fourth metal ring 1402 extends 360° around the first section 102 and includes a plurality of circular apertures 1402A that extend entirely through the fourth metal ring 1402 thereby exposing the first wall 424 of the hose cuff 100. The first wall 424 may be formed of a plastic or another nonmetallic material.

The hose cuff 100 with the fourth metal ring 1402 may be inserted into a pin-type inlet valve 600 at a first position or a second positon. At the first positon, both pins 1010 may contact the fourth metal ring 1402 thereby turning on a central vacuum system as described herein. At the second positon, at least one of the pins 1010 may extend through one of the circular apertures 1402A and may contact the first wall 424. When at least one of the pins 1010 contacts the first wall 424 or otherwise extends through a circular aperture 1402A does not contact the fourth metal ring 1402A, there is no electrical connection between the pins 1010 which keeps the central vacuum system off and allows the central vacuum system to be controlled by an RF system of the central vacuum system. The hose cuff 100 with the fourth metal ring 1402 is rotatable between the first positon and the second positon. Furthermore, the hose cuff 100 with the fourth metal ring 1402 may be inserted into a locking-mechanism inlet valve 1100. When inserted into the locking-mechanism inlet valve 1100, the central vacuum system remains off allowing the central vacuum system to be controlled by an RF system of the central vacuum system.

Figure 15:
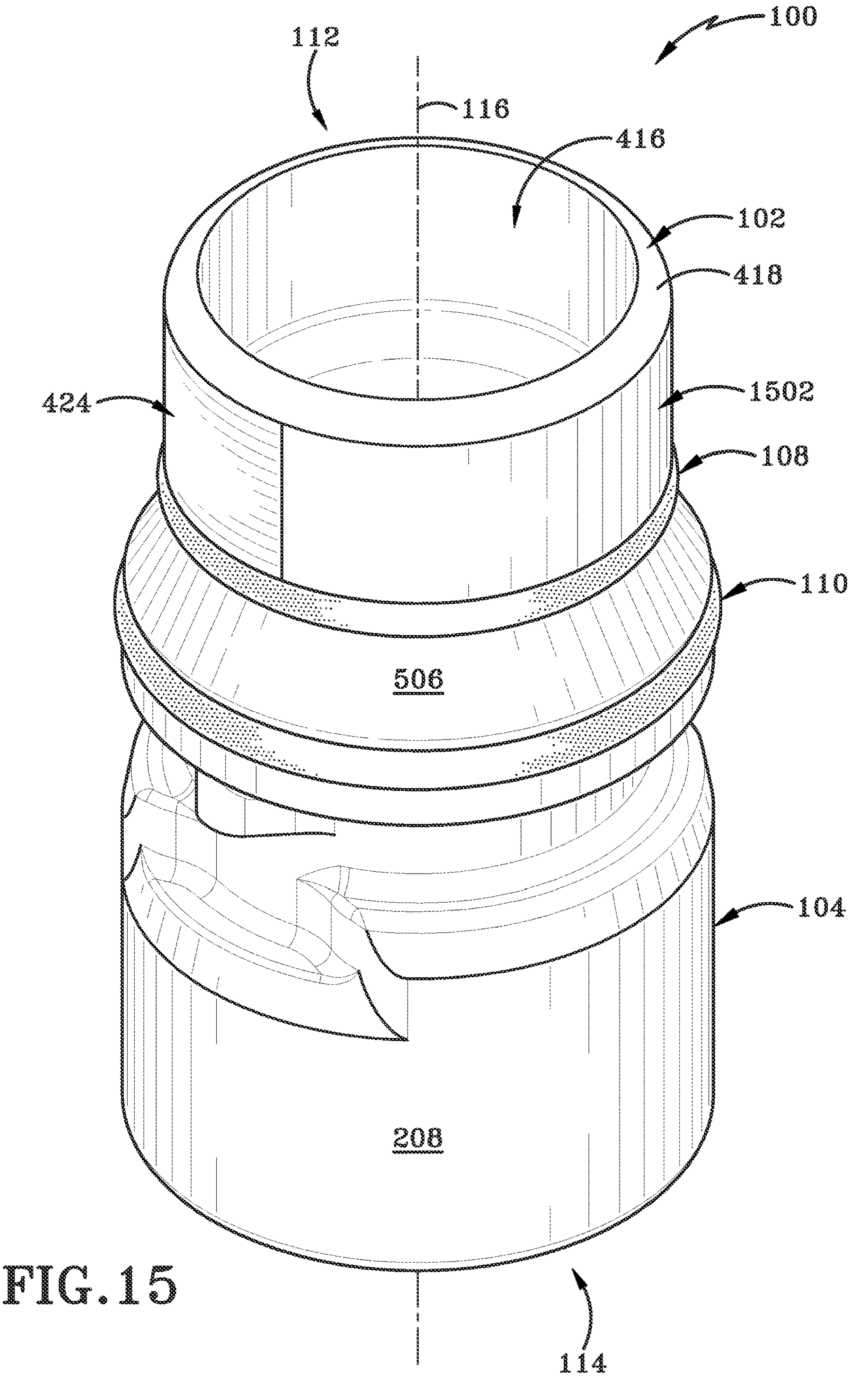
FIG. 15 is a perspective view of a hose cuff with an exemplary embodiment of a metal band of the present disclosure.

FIG. 15 depicts the hose cuff 100 with a metal band 1502. The metal band 1502 extends less than 360° around the first section 102. In this embodiment, the first wall 424 is flush with the metal band 1502. The first wall 424 may be formed of a plastic material or another nonmetallic material.

The hose cuff 100 with the metal band 1502 may be inserted into a pin-type inlet valve 600 at a first position or a second position. At the first position, the both pins 1010 may contact the metal band 1502 thereby turning on a central vacuum system as previously described herein. At the second positon, at least one of the pins 1010 may contact the first wall 424 of the hose cuff 100 or at least does not contact the metal band 1502. When the at least one of the pins 1010 contacts the first wall 424, there is no electrical connection between the pins 1010 which keeps the central vacuum system off and allows the central vacuum system to be controlled by an RF system of the central vacuum system. The hose cuff 100 with the metal band 1502 is rotatable between the first positon and the second position. Furthermore, the hose cuff 100 with the metal band 1502 may be inserted into a locking-mechanism inlet valve 1100. When inserted into the locking-mechanism inlet valve 1100, the central vacuum system remains off allowing the central vacuum system to be controlled by an RF system of the central vacuum system.

Figure 16:
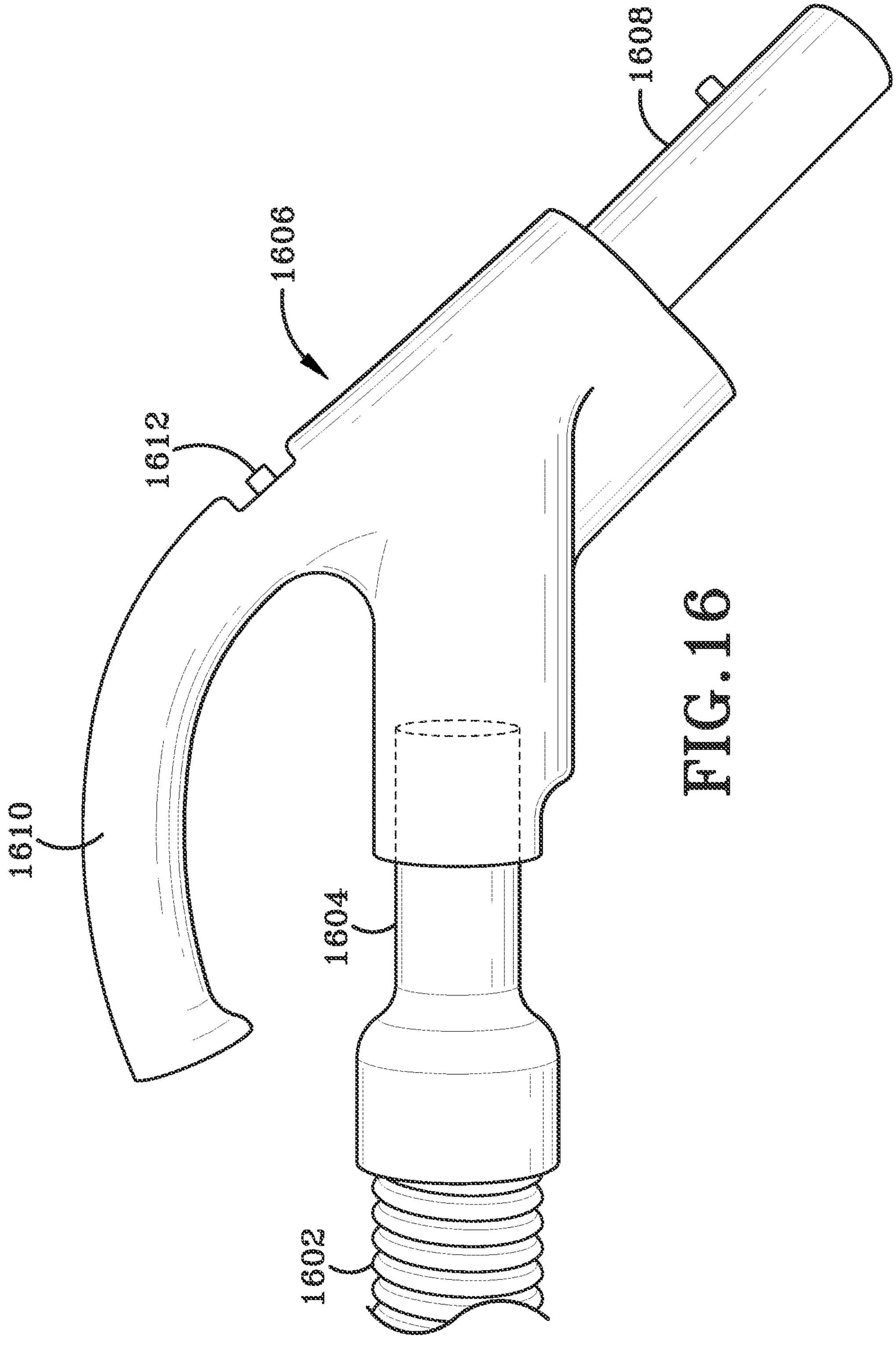
FIG. 16 is an operational view of a handle assembly with a hose assembly.

FIG. 16 depicts an embodiment of a hose assembly for use with a central vacuum system that includes an RF system. In this embodiment, the hose assembly includes a hose 1602 connected to a nozzle 1604 and the hose cuff 100, wherein the hose cuff 100 includes one of the second metal ring 1202, the third metal ring 1302, the fourth metal ring 1402 or the metal band 1502. When the hose cuff 100 is inserted into an inlet valve of a central vacuum system, the nozzle 1604 is in open communication with the central vacuum system. Furthermore, the nozzle 1604 is removably connected to a handle assembly 1606. The handle assembly 1606 includes a handle nozzle 1608 and a handle 1610. When the handle assembly 1606 is connected to the nozzle 1604, the handle nozzle 1608 is in open communication with the central vacuum system. Accordingly, when the central vacuum system is in operation, a user may guide the handle nozzle 1608 via the handle 1610 in order to uptake dirt and debris from a surface.

The handle assembly 1606 further includes an RF transmitter that is in wireless communication with an RF receiver of the central vacuum cleaning system. The RF transmitter is connected to a switch 1612 of the handle assembly 1606. When the switch 1612 is engaged by the user, the switch 1612 causes the RF transmitter of the handle assembly 1606 to send a signal to the RF receiver of the central vacuum cleaning system to toggle a state of the central vacuum cleaning system (i.e., from off to on or on to off).

In one example, a user may insert the hose cuff 100 with the second metal ring 1202, the third metal ring 1302, the fourth metal ring 1402, or the metal band 1502 into the pin-type inlet valve 600 at a first position. At the first position, both of the pins 1010 contact metal of the second metal ring 1202, the third metal ring 1302, the fourth metal ring 1402, or the metal band 1502 and the central vacuum system is turned on. The user may rotate the hose cuff from the first positon to a second positon, wherein at the second positon at least one of the pins 1010 contacts the first wall 424 thereby turning the central vacuum system off as described herein. When in this position, a user may engage the switch 1612 a first time to toggle the central vacuum system from off to on. After the user has completed vacuuming an area, the user may engage the switch 1612 a second time to toggle the central vacuum system from on to off.

In another example, a user may insert the hose cuff with the second metal ring 1202, the third metal ring 1302, the fourth metal ring 1402, or the metal band 1502 at a second position. At the second position, at least one pin 1010 contacts the first wall 424 or at least does not contact the second metal ring 1202, the third metal ring 1302, the fourth metal ring 1402, or the metal band 1502. In this position, a user may engage the switch 1612 a first time to turn on the central vacuum system and may engage the switch 1612 a second time to turn off the central vacuum system. If a user desires to automatically turn on the central vacuum system, a user may rotate the hose cuff 100 from the second positon to a first positon, where both pins 1010 contact a metal portion of the second metal ring 1202, the third metal ring 1302, the fourth metal ring 1402 or the metal band 1502 thereby automatically turning on the central vacuum system.

In yet another example, a user may insert the hose cuff 100 with the metal ring 106, second metal ring 1202, the third metal ring 1302, the fourth metal ring 1402, or the metal band 1502 into a locking-mechanism inlet valve 1100. When the hose cuff 100 is inserted into the locking-mechanism inlet valve 1100, the central vacuum system remains off. The user may engage the switch 1612 a first time to turn on the central vacuum system and may engage the switch 1612 a second time to turn off the central vacuum system.

Various inventive concepts may be embodied as one or more methods. The acts performed as part of the method may be ordered in any suitable way. Accordingly, embodiments may be constructed in which acts are performed in an order different than illustrated, which may include performing some acts simultaneously.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clarity, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A hose cuff on a vacuum hose for connection with at least two different valves in a central vacuum system and the at least two different valves are composed of a primary valve that stores the vacuum hose therein and a secondary valve that is different than the primary valve, the secondary valve comprising at least two metal pins, the hose cuff comprising:

a first end;

a second end opposite the first end;

a longitudinal axis between the first end and the second end;

a first wall;

an annular wall comprising a first end adjacent to the first end of the hose cuff and a second end opposite the first end of the annular wall;

a first ledge that extends radially inward relative to the longitudinal axis from the second end of the annular wall to the first wall, wherein the first wall comprises a first end adjacent to the first ledge and a second end opposite the first end of the first wall;

a conductive metal ring circumscribing the longitudinal axis exterior the first wall, and the conductive metal ring comprising an outer surface that faces away from the longitudinal axis, and the outer surface configured to contact the at least two metal pins on the secondary valve and adapted to complete an electrical circuit to turn on the central vacuum system;

an annular channel that fully circumscribes the hose cuff, wherein the annular channel is located closer to the second end of the hose cuff than the first end of the hose cuff, and the annular channel is located closer to the second end of the hose cuff than the conductive metal ring, wherein the annular channel is configured to receive a portion of the primary valve to connect the hose cuff to the primary valve thereby coupling the vacuum hose to the primary valve;

wherein the conductive metal ring is radially exterior the first wall, disposed closer to the second end of the hose cuff than the annular wall, and the outer surface does not extend beyond a radially outermost point of the annular wall relative to the longitudinal axis, wherein the conductive metal ring is configured to contact the at least two metal pins on the secondary valve to electrically connect the hose cuff to the secondary valve thereby coupling the vacuum hose to the secondary valve; and wherein the hose cuff is configured to selectively connect with either of the primary valve and the secondary valve, and wherein the primary valve is configured to store the vacuum hose behind or within a wall and enable the vacuum hose to be extracted from the primary valve and moved to another location to connect with the secondary valve having a different connection type than the primary valve, and wherein the hose cuff effectuates a universality for the vacuum hose by permitting the vacuum hose to connect with the at least two different valves.

2. The hose cuff of claim 1, further comprising:

a first section adjacent to the first end that is adapted to connect to the primary inlet valve, wherein the conductive metal ring is at the first section; and a second section adjacent to the second end that is adapted to connect to the secondary valve wherein the first section comprises a first end adjacent to the first end of the hose cuff and a second end opposite the first end of the first section and wherein the metal ring receives the second end of the first section.

3. The hose cuff of claim 1, further comprising:

a first elastomeric O-ring that is radially further from the longitudinal axis than a radially outermost point of the annular wall.

4. The hose cuff of claim 3, wherein the first elastomeric O-ring is adapted to form a hermetic seal between the hose cuff and the primary valve and the first elastomeric O-ring is adapted to contact the secondary valve when the conductive metal ring is electrically connected to the secondary valve.

5. The hose cuff of claim 4, wherein the first elastomeric O-ring has a surface first portion facing the first end of the hose cuff and a surface second portion facing the second end of the hose cuff and wherein the surface first portion of the first elastomeric O-ring contacts the conductive metal ring.

6. The hose cuff of claim 5, further comprising an annular pitched wall that angles radially outward and is located between the conductive metal ring and the annular channel.

7. The hose cuff of claim 1, wherein the conductive metal ring extends 360° around the longitudinal axis.

8. The hose cuff of claim 1, wherein the conductive metal ring defines at least one notch, and wherein nonconductive material is adjacent to the at least one notch.

9. The hose cuff of claim 1, wherein the conductive metal ring defines at least one circular aperture and wherein nonconductive material is adjacent or within the at least one circular aperture.

10. The hose cuff of claim 1, wherein the conductive metal ring defines at least one oblong aperture and wherein the oblong aperture is adjacent to a nonconductive portion.

11. An adapter for connection with a hose cuff on a vacuum hose, wherein the hose cuff connects with a primary valve in a central vacuum system and the adapter connected to the hose cuff connects with a secondary valve in the central vacuum system, wherein the primary valve is different than the secondary valve, the adapter comprising:

a first end;

a second end opposite the first end;

a longitudinal axis;

a conductive metal ring circumscribing the longitudinal axis, and the conductive metal ring comprising an outer surface that faces away from the longitudinal axis; and a cylindrical wall that extends from the first end to the second end and comprises a first wall portion that is surrounded by the conductive metal ring and a second wall portion that is sized to be received within a bore of a vacuum hose cuff, wherein the first wall portion is located closer to the first end than the second wall portion, and wherein the conductive metal ring is configured to contact at least two metal pins on the secondary valve to electrically connect the adapter to the secondary valve thereby coupling the vacuum hose to the secondary valve;

wherein an external diameter of the first wall portion is greater than an external diameter of the second wall portion; and wherein connection of the adapter to the hose cuff effectuates selective connection with either the primary valve and the secondary valve, and wherein the primary valve is configured to store the vacuum hose behind or within a wall and enable the vacuum hose to be extracted from the primary valve and moved to another location to connect with the secondary valve having a different connection type than the primary valve, and wherein the adapter and the hose cuff connected together effectuates a universality for the vacuum hose by permitting the vacuum hose to connect with at least two different valves.

12. The adapter of claim 11, further comprising: an annular curved wall comprising a first end adjacent to the first end of the adapter and a second end opposite the first end of the annular curved wall, a first ledge that extends radially inward relative to the longitudinal axis from the second end of the annular curved wall to the cylindrical wall, wherein the cylindrical wall comprises a first end adjacent to the first ledge and a second end opposite the first end of the cylindrical wall, wherein the first end of the cylindrical wall is on the first wall portion and the second end of the cylindrical wall is on the second wall portion; wherein the conductive metal ring is radially exterior the first wall portion, disposed closer to the second end of the hose cuff than the annular curved wall, and wherein the outer wall surface and the second end of the annular curved wall have the same radius from the longitudinal axis.

13. The adapter of claim 11, further comprising:

wherein the conductive metal ring entirely circumscribes the longitudinal axis, and wherein the conductive metal ring is configured to contact the at least two pins to complete an electrical circuit to turn on the central vacuum system.

14. A hose cuff on a vacuum hose for connection with two different valves in a central vacuum system the at least two different valves are composed of a primary valve that stores the vacuum hose therein and a secondary valve that is different than the primary valve, the secondary valve comprising at least two metal pins, the hose cuff comprising: a first end; a second end opposite the first end; a longitudinal axis between the first end and the second end; a first section adjacent to the first end that is adapted to connect to a secondary valve, wherein the first section is configured to connect with the secondary valve to electrically connect the hose cuff to the secondary valve thereby coupling the vacuum hose to the secondary valve; and a second section adjacent to the second end, wherein the second section defines an annular channel that is configured to receive a portion of the primary valve to connect the hose cuff to the primary valve thereby coupling the vacuum hose to the primary valve; and a conductive metal ring circumscribing the longitudinal axis at the first section configured to contact the at least two metal pins on the first inlet valve and adapted to complete an electrical circuit to turn on the central vacuum system, wherein the conductive metal ring is located closer to the first end than the annular channel in the second section, wherein the conductive metal ring is configured to contact the at least two metal pins when inserted into the secondary valve; wherein the metal ring receives the second end of the first section and wherein the first section comprises a radial outermost point relative to the longitudinal axis with respect to the first section, wherein the conductive metal ring comprises an outer surface that faces away from the longitudinal axis, wherein the channel in the second section is configured to interlock with the primary valve, and wherein the hose cuff is configured to selectively connect with either of the primary valve and the secondary valve, and wherein the primary valve is configured to store the vacuum hose behind or within a wall and enable the vacuum hose to be extracted from the primary valve and moved to another location to connect with the secondary valve having a different connection type than the primary valve, and wherein the hose cuff effectuates a universality for the vacuum hose by permitting the vacuum hose to connect with the at least two different valves.

15. The adapter of claim 12, further comprising:

a second ledge perpendicular to the longitudinal axis.

16. The adapter of claim 15, wherein the second ledge extends radially inward relative to the longitudinal axis from the second end.

17. The adapter of claim 16, wherein the conductive metal ring has a cross sectional width that is substantially the same length as the first ledge.

18. The adapter of claim 15, further comprising:

a first elastomeric O-ring that is contiguous with the second ledge.

19. The adapter of claim 18, wherein the first elastomeric O-ring is disposed at an end of the conductive metal ring furthest from the first end.

20. The adapter of claim 11, further comprising:

a length of the first wall portion measured relative to the longitudinal axis;

a length of the second wall portion measured relative to the longitudinal axis; wherein the length of the first wall portion and the length of the second wall portion are approximately equal.

21. The adapter of claim 11, further comprising:

a length of the first wall portion measured relative to the longitudinal axis;

a length of the conductive metal ring measured relative to the longitudinal axis; wherein the length of the first wall portion and the length of the conductive metal ring portion are approximately equal.

22. The hose cuff of claim 14, wherein the first section is distinct from the from the second section, and the first section is formed as a uniform, monolithic member.

* * * * *